US012733668B2

(12) United States Patent
Wilhelmsen et al.

(10) Patent No.: US 12,733,668 B2
(45) Date of Patent: Sep. 15, 2026

(54) METHODS AND SYSTEMS FOR VALIDATING WASH PROCESSES AND PREVENTING PROCESS DEVIATIONS IN FOOD PROCESSING

(71) Applicant: SMARTWASH SOLUTIONS, LLC, Salinas, CA (US)

(72) Inventors: Eric Child Wilhelmsen, Milpitas, CA (US); Christopher Michael McGinnis, Salinas, CA (US); James M. Brennan, Pleasanton, CA (US); Angela O. Núnez, Salinas, CA (US)

(73) Assignee: SMARTWASH SOLUTIONS, LLC, Salinas, CA (US)

( * ) Notice: Subject to any disclaimer, the term of this patent is extended or adjusted under 35 U.S.C. 154(b) by 348 days.

(21) Appl. No.: 18/340,269

(22) Filed: Jun. 23, 2023

(65) Prior Publication Data

US 2023/0354870 A1 Nov. 9, 2023

Related U.S. Application Data

(63) Continuation of application No. 16/854,448, filed on Apr. 21, 2020, now Pat. No. 11,684,078.

(60) Provisional application No. 62/837,010, filed on Apr. 22, 2019.

(51) Int. Cl.
*A23N 12/02* (2006.01)
*A47J 43/24* (2006.01)

(52) U.S. Cl.
CPC .............. *A23N 12/02* (2013.01); *A47J 43/24* (2013.01)

(58) Field of Classification Search
None
See application file for complete search history.

(56) References Cited

U.S. PATENT DOCUMENTS 10,499,679 B2 12/2019 Brennan et al.
2014/0279750 A1* 9/2014 Iliopoulos ........... C23C 16/4405 706/12
2016/0095475 A1 4/2016 Brennan et al.
2017/0156390 A1 6/2017 Brennan et al.
2017/0238592 A1 8/2017 Bigott
2018/0093901 A1 4/2018 Brennan et al.
2018/0231496 A1 8/2018 Brennan et al.
2018/0295864 A1 10/2018 Bertha et al.
2019/0049419 A1 2/2019 Wilhelmsen et al.

FOREIGN PATENT DOCUMENTS

WO 2019199337 A1 10/2019

OTHER PUBLICATIONS

Mexican Office Action, dated Jun. 6, 2025 for corresponding Application No. MX/a/2021/012821.
EPO Office Action dated Oct. 16, 2024, for European Patent Application No. 20725033.3.
AU Office Action dated May 7, 2025, for Australian Patent Application No. 2020262103.
Gombas et al., "Guidelines to Validate Control of Cross-Contamination during Washing of Fresh-Cut Leafy Vegetables", Journal of Food Protection, vol. 80, No. 2, 2017, pp. 312-330.
Grigg, "Statistical process control in UK food production: an overview", International Journal of Quality & Reliability Management, vol. 15, No. 2, Mar. 1, 1998, pp. 223-238.
International Invitation to Pay Additional Fees dated Jul. 17, 2020, corresponding to Application No. PCT/US2020/029305.
International Search Report and Written Opinion dated Sep. 16, 2020, corresponding to Application No. PCT/US2020/029305.
International Second Written Opinion dated May 14, 2021, corresponding to Application Nol PCT/US2020/029305.
Shuxiang et al., "Microbial validation of radio frequency pasteurization of wheat flour by inoculated pack studies", Journal of Food Engineering, vol. 217, Jan. 1, 2018 (Jan. 1, 2018), pp. 68-74, XP055779927.
Website: https://www.safetraces.com/, last accessed Mar. 4, 2022.
Web-pages at: https://www.3m.com/3M/en_US/food-safety-us/, last accessed Mar. 4, 2022.
Perez-Rodriguez F. et a, "International Journal of Food Microbiology—Study of the Cross-Contamination and Survival of *Salmonella* in Fresh Apples", XP055824896, 184, pp. 92-97, ISSN: 0168-1605, DOI: 10.1016/j.ijfoodmicro.2014.03.026, Aug. 1, 2014 (Jan. 8, 2014).
Canadian Office Action dated Aug. 27, 2025 for corresponding Application No. 3137155.
Australian Examination Report from AU Application No. 2025210761 dated Jun. 4, 2026.

* cited by examiner

*Primary Examiner* — Natasha N Campbell
(74) *Attorney, Agent, or Firm* — Patterson + Sheridan, LLP

(57) ABSTRACT

Methods and apparatus for validating wash processes and related operations for food processing, including preventing undesirable deviations in such food processing. One example method for validating a process for a food processing system generally includes: operating the food processing system on a food product according to the process, wherein the operating is performed for at least a validation period; measuring a process metric at multiple times during the validation period while the food processing system is operating according to the process, wherein the measuring generates a set of process metric measurements; and determining whether the process for the food processing system is valid, based on the set of process metric measurements.

15 Claims, 6 Drawing Sheets

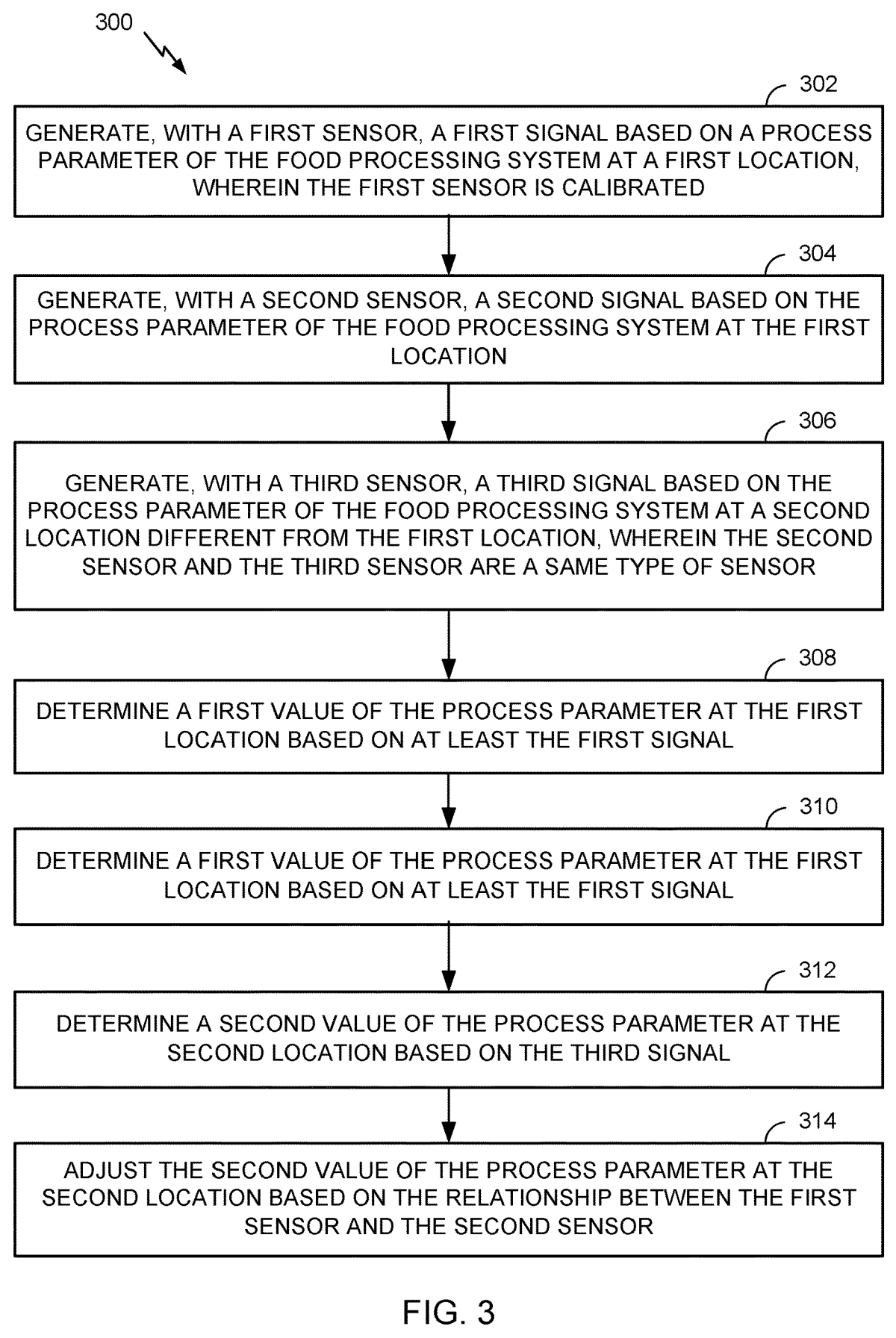

300

302
GENERATE, WITH A FIRST SENSOR, A FIRST SIGNAL BASED ON A PROCESS PARAMETER OF THE FOOD PROCESSING SYSTEM AT A FIRST LOCATION, WHEREIN THE FIRST SENSOR IS CALIBRATED

304
GENERATE, WITH A SECOND SENSOR, A SECOND SIGNAL BASED ON THE PROCESS PARAMETER OF THE FOOD PROCESSING SYSTEM AT THE FIRST LOCATION

306
GENERATE, WITH A THIRD SENSOR, A THIRD SIGNAL BASED ON THE PROCESS PARAMETER OF THE FOOD PROCESSING SYSTEM AT A SECOND LOCATION DIFFERENT FROM THE FIRST LOCATION, WHEREIN THE SECOND SENSOR AND THE THIRD SENSOR ARE A SAME TYPE OF SENSOR

308
DETERMINE A FIRST VALUE OF THE PROCESS PARAMETER AT THE FIRST LOCATION BASED ON AT LEAST THE FIRST SIGNAL

310
DETERMINE A FIRST VALUE OF THE PROCESS PARAMETER AT THE FIRST LOCATION BASED ON AT LEAST THE FIRST SIGNAL

312
DETERMINE A SECOND VALUE OF THE PROCESS PARAMETER AT THE SECOND LOCATION BASED ON THE THIRD SIGNAL

314
ADJUST THE SECOND VALUE OF THE PROCESS PARAMETER AT THE SECOND LOCATION BASED ON THE RELATIONSHIP BETWEEN THE FIRST SENSOR AND THE SECOND SENSOR

FIG. 3

METHODS AND SYSTEMS FOR VALIDATING WASH PROCESSES AND PREVENTING PROCESS DEVIATIONS IN FOOD PROCESSING

CROSS-REFERENCE TO RELATED APPLICATIONS

The present application for patent is a continuation of U.S. patent application Ser. No. 16/854,448, filed Apr. 21, 2020, which claims benefit of U.S. Provisional Patent Application Ser. No. 62/837,010, filed Apr. 22, 2019, which are assigned to the assignee hereof and hereby expressly incorporated by reference herein.

BACKGROUND

Technical Field

Apparatus and methods of the present disclosure relate to validating wash processes and related operations for food processing, including preventing undesirable deviations in such food processing.

Description of the Related Art

Many foods are processed with two-stage washing in food processing systems. Repeating the same wash a third time generally yields no further benefits if the first two stages have been properly managed. For example, a primary wash system may remove dirt and debris. The primary wash system may also handle the bulk of the soluble organic load from any cutting or chopping operation. The secondary wash, whose water chemistry is generally easier to manage, is intended to complete the sanitation of the product. In recent years, improved control of the water chemistry of process water used in both the primary and secondary wash systems has led to improvements in the sanitation of washed products and the control of cross-contamination; however, more improvement is still desirable to better mitigate microbial risk to consumers.

Engineering efforts have produced various flumes and tanks to provide agitation and mechanical action to enhance the sanitation process. For example, air jets and turbulence are designed into many systems. None of these designs has been so overwhelmingly successful that all previous equipment designs were superseded. In some cases, different designs are preferred for certain product types for quality reasons. For these and other reasons, the food processing industry includes a wide variety of equipment.

Sensors, such as electrodes, are used to monitor various attributes of process and wash water and other solutions, particularly in the food processing industry. The sensors may be in direct contact with the solution, or indirectly in contact with the solution through an interface or window. Sensors used to measure chlorine concentration and acidity (e.g., pH) of a solution are examples of sensors that may be in direct contact with the solution. As an example of indirect contact, the property of turbidity may be measured optically through a window by a sensor. The property of dissolved oxygen in a solution is often measured by a sensor (e.g., an oxygen electrode) behind a permeable membrane. The property of conductance of the solution may be measured directly by a sensor contacting the solution. These examples are not an exhaustive list.

Traditional process validations have been pass-or-fail determinations based on a metric such as achieving less than a predetermined microbial enumeration or the absence of detection in a heat penetration study or a challenge study. Such procedures work well for processes that achieve steady state conditions or are controlled to defined steady state conditions. Most thermal processes and pasteurizations fall into this category. Newer ultra-high pressure processes also fall into this category. However, there are many processes where the conditions are much less controlled and steady state is better defined as a range of conditions, such that this historic approach is inadequate.

The U.S. Food and Drug Administration's Food Safety Modernization Act (FSMA), signed into law on Jan. 4, 2011, mandates validation of processes used for food. It also insists on verification. This applies even to foods that are normally considered unprocessed or are minimally processed. The validation of these alternative processes is more complex and less well understood than more traditional thermally processed products, where there is over 200 years of experience. In instances where there is a recognized kill step, such as ultrahigh pressure processing or other pasteurization, the extrapolation is less difficult. However, the wash process for ready-to-eat (RTE) leafy greens is much less well understood and much less effective. The problem is similar for other mostly fresh products such as poultry or other meat products, including fish. For example, the problems of maintaining water hygiene in chillers for these meat products are very similar to the problems of maintaining water hygiene in produce wash operations. Systems that use indoor cultivation and other similar isolation as means to avoid pathogens still have processes that call for validation, because the systems that provide the isolation should be validated as protecting against pathogen contamination.

There is a modest body of literature describing the results of various wash processes on specific products with specific genera of bacteria, but this literature does not elucidate how to assure that the desired process conditions are met or exceeded. This is typical of many products that are partially prepared before delivery to the consumer. Value-added produce and meat (e.g., poultry) are important examples. Additionally, a valid process is not the end goal. A valid process should be managed and controlled in such a way that one can verify that a valid process was performed on all of the processed product. Furthermore, it is prudent to have preventative measures in place that will ensure that, when a deviation occurs, product is diverted or that processing is halted until the deviation is corrected.

Accordingly, improvements to validation and verification of processes where a kill step is not present are desirable.

SUMMARY

The systems, methods, apparatus, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved food safety.

Certain aspects of the present disclosure provide a method for validating a food processing system. The method generally includes operating the food processing system on a food product according to the process, wherein the operating is performed for at least a validation period; measuring a process metric at multiple times during the validation period while the food processing system is operating according to the process, wherein the measuring generates a set of process metric measurements; and determining whether the process for the food processing system is valid, based on the set of process metric measurements.

Certain aspects of the present disclosure provide a computer-readable medium including instructions, executable by one or more processors, for performing operations for validating a process for a food processing system, the operations generally including: operating the food processing system on a food product according to the process, wherein the operating is performed for at least a validation period; measuring a process metric at multiple times during the validation period while the food processing system is operating according to the process, wherein the measuring generates a set of process metric measurements; and determining whether the process for the food processing system is valid, based on the set of process metric measurements.

Certain aspects of the present disclosure provide a system for validating a process for food processing, The system generally includes: at least one processor configured to control operation of a food processing system on a food product according to the process, for at least a validation period; and at least one sensor coupled to the at least one processor and configured to measure a process metric at multiple times during the validation period while the food processing system is operating according to the process, wherein the measuring generates a set of process metric measurements and wherein the at least one processor is further configured to determine whether the process for the food processing system is valid, based on the set of process metric measurements.

Certain aspects of the present disclosure provide a system for verifying operation of a food processing system. The system generally includes: a first sensor configured to generate a first signal based on a process parameter of the food processing system at a first location, wherein the first sensor is calibrated; a second sensor configured to generate a second signal based on the process parameter of the food processing system at the first location; a third sensor configured to generate a third signal based on the process parameter of the food processing system at a second location different from the first location, wherein the second sensor and the third sensor are a same type of sensor; and a first processor configured to: determine a first value of the process parameter at the first location based on at least the first signal; determine a relationship between the first sensor and the second sensor based on the first signal and the second signal; determine a second value of the process parameter at the second location based on the third signal; and adjust the second value of the process parameter at the second location based on the relationship between the first sensor and the second sensor.

Certain aspects of the present disclosure provide a method for verifying operation of a food processing system. The method generally includes: generating, with a first sensor, a first signal based on a process parameter of the food processing system at a first location, wherein the first sensor is calibrated; generating, with a second sensor, a second signal based on the process parameter of the food processing system at the first location; generating, with a third sensor, a third signal based on the process parameter of the food processing system at a second location different from the first location, wherein the second sensor and the third sensor are a same type of sensor; determining a first value of the process parameter at the first location based on at least the first signal; determining a relationship between the first sensor and the second sensor based on the first signal and the second signal; determining a second value of the process parameter at the second location based on the third signal; and adjusting the second value of the process parameter at the second location based on the relationship between the first sensor and the second sensor.

Certain aspects of the present disclosure provide a system for validating operation of a food processing system. The system generally includes: a first sensor configured to generate a first signal based on a process parameter of the food processing system at a first location, wherein the first sensor is calibrated; a second sensor configured to generate a second signal based on the process parameter of the food processing system at the first location; a third sensor configured to generate a third signal based on the process parameter of the food processing system at a second location different from the first location, wherein the second sensor and the third sensor are a same type of sensor; and a first processor configured to: determine a first value of the process parameter at the first location based on at least the first signal; determine a relationship between the first sensor and the second sensor based on the first signal and the second signal; determine a second value of the process parameter at the second location based on the third signal; adjust the second value of the process parameter at the second location based on the relationship between the first sensor and the second sensor; determine at least one boundary for a plurality of measurements of the process parameter by the first sensor at the first location that indicate the process parameter at the second location is within an appropriate range for appropriate operation of the food processing system.

Certain aspects of the present disclosure provide a method for validating a food processing system. The method generally includes processing a food product according to at least one process parameter of the food processing system; sensing the at least one process parameter during the processing; calculating a first variance or a first standard deviation of the sensed process parameter for a first period during the processing; and determining, based on the first variance or the first standard deviation of the sensed process parameter, a length of a validation period for subsequent processing of the food product.

Certain aspects of the present disclosure provide a method for operating a food processing system. The method generally includes: processing food according to one or more process parameters of the food processing system; estimating errors in measurements of the one or more process parameters; determining, based on one or more first process parameters of the process parameters and the estimated errors corresponding to the one or more first process parameters, a margin of safety for a second process parameter of the one or more process parameters; determining that a value of the second process parameter is outside of the margin of safety; and taking an action regarding the food in response to the determination that the value of the second process parameter is outside of the margin of safety.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 3 is a flow diagram of example operations for verifying operation of a food processing system, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
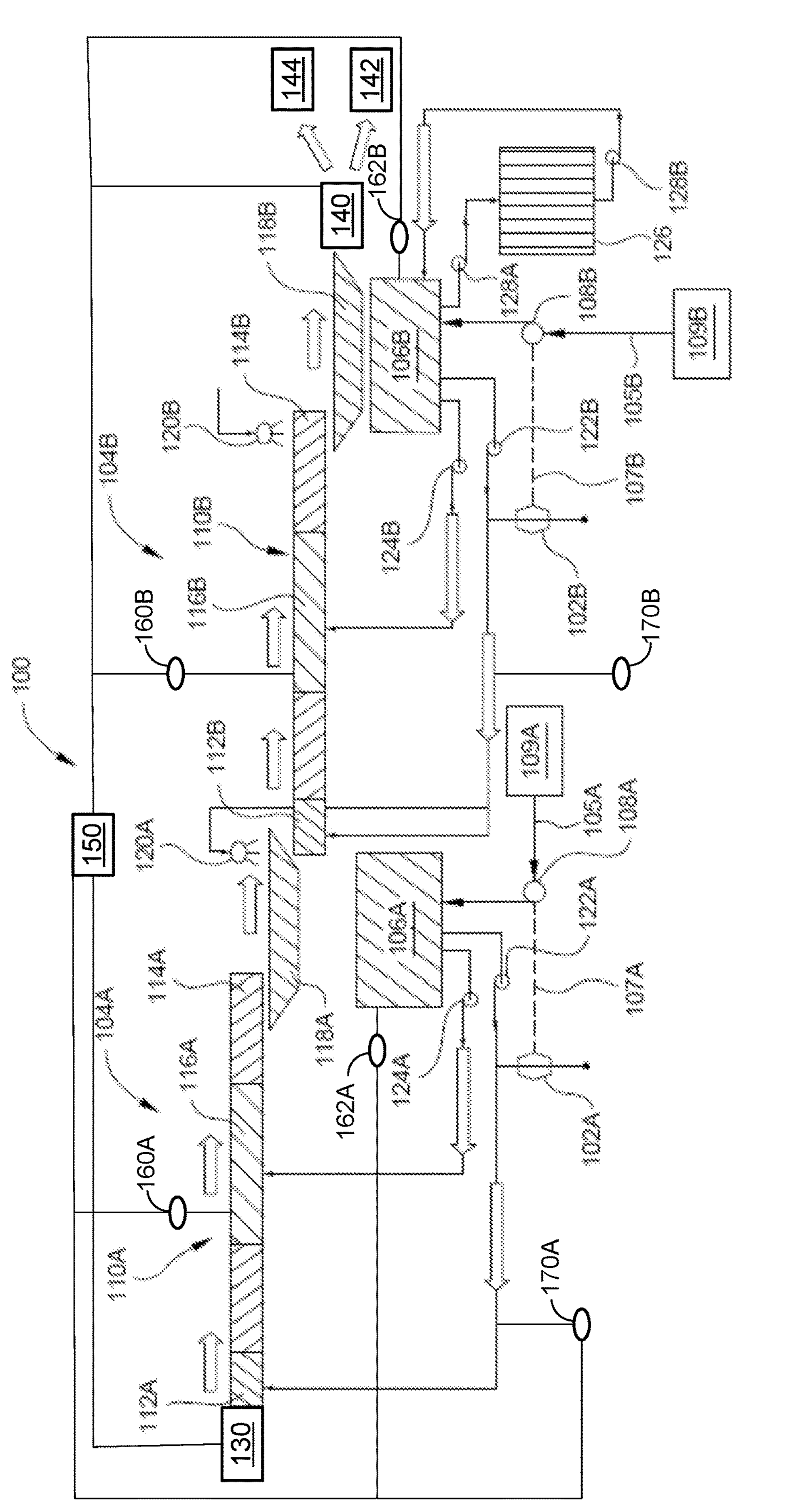
FIG. 1 is a block diagram of a food product processing system, in accordance with certain aspects of the present disclosure.

Aspects of the present disclosure provide apparatus, systems, and methods, for validating wash processes and/or other operations related to food processing, including preventing undesirable deviations in such food processing.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

As shown and described herein, various features of the disclosure will be presented. Various embodiments may have the same or similar features, and thus, the same or similar features may be labeled with the same reference numeral. Although similar reference numbers may be used in a generic sense, various embodiments will be described and various features may include changes, alterations, modifications, etc. as would be appreciated by those of skill in the art, whether explicitly described or otherwise.

Example Food Processing System

Certain aspects of the present disclosure may include a process water control system that includes multiple sensors. Each of the sensors may be used to receive process water from the food processing system and measure a property (e.g., chlorine concentration or pH) with respect to the process water. The data generated with these sensors can be used for many purposes, but is particularly useful in assessing the status of the operation for process verification and for understanding the process done as part of a validation.

The food processing system may include a process water monitoring flow path in fluid communication with a process water supply of the food processing system. For example, the process water supply may refer to a tank or reservoir of the process water used within the food processing system, or may refer generally to the process water used within and circulated throughout the food processing system, particularly in an embodiment in which the food processing system does not include a tank or reservoir for containing, at least temporarily, the process water.

The food processing system may further include other elements related to a food processing system, such as a food processing stage (e.g., a food washing stage) that processes food with process water from the process water supply, and a process water supply pump to pump the process water from the process water supply along a wash line flow path to the food processing stage. The process water supply may be used to receive process water downstream from the food processing stage with the process water recirculated to the food processing stage using the pump. Further, the food processing system may include a process water supply cooling element, such as a chiller, to cool the process water in the process water supply. The process water supply cooling element may be separate and distinct from the temperature adjustment element.

FIG. 1 is a schematic diagram of a food processing system 100 (also referred to herein as a "process line") including one or more water control and monitoring systems 102A and 102B in accordance with aspects of the present disclosure. In particular, the food processing system 100 includes a first water control system 102A and a second water control system 102B in this embodiment, though additional or fewer water control systems may be used without departing from the scope of the present disclosure. The water control systems 102A and 102B are used to monitor and control process water used within the food processing system 100. The water control system 102A or 102B, or a control unit thereof, that may be used in accordance with the present disclosure may be the Automated SmartWash Analytical Platform (ASAP)™, available from SmartWash Solutions, LLC of Salinas, California, and as described in U.S. Patent Application Publication No. 2018/0093901 to Brennan et al., filed on Oct. 3, 2017 and entitled "System for Controlling Water Used for Industrial Food Processing," which is incorporated by reference herein in its entirety.

The food processing system 100 further includes a first food processing stage 104A and a second food processing stage 104B, though additional or fewer food processing stages may be used without departing from the scope of the present disclosure. Further, the first food processing stage 104A is shown as being upstream of the second food processing stage 104B with respect to the flow or processing of food through the food processing system 100. As shown and discussed within the description below, the food processing stages 104A and 104B generally include similar elements and configurations. However, the present disclosure is not so limited, as different elements and configurations may be used for each food processing stage without departing from the present disclosure.

The food processing system 100 uses process water (e.g., a water-based solution with chemical additives) to process and wash food received from a container 130 (e.g., a hopper). The container 130 may be equipped with a powered gate controlled by a controller 150 of the food processing system. The controller may open or close the gate to control the flow of food into the processing system 100. Additionally or alternatively, the food may be manually supplied from the container 130 into the food processing system 100, and the controller 150 may control an indicator (e.g., a light, a buzzer, and/or a bell) indicating to an operator whether to supply the food into the processing system 100.

The controller 150 may receive information regarding process parameters (e.g., process water temperature, process water pH, or process water free active chlorine concentration) from one or more sensors 160A, 160B, 162A, and 162B. The controller may open or close a gate of the container 130 in response to changes in the process parameters. In some cases, the controller 150 may stop product feed (i.e., movement of food into the food processing system 100) if a process parameter is out of specification for either of the food processing stages 104A and 104B.

The controller 150 may also send indications (e.g., control signals, turning on a light, and/or turning on a buzzer) to control a gateway 140 through which food exits the food processing system 100. In some cases, the controller 150 may directly control the gateway (e.g., send a control signal to a motor operating the gate of the gateway) to direct food exiting the food processing system 100 into a container 142 for packing for delivery to consumers. If the controller 150 determines that a process parameter is out of specification, the controller may directly control the gateway (e.g., send a different control signal to a motor operating the gate of the gateway) to direct exiting food into another container 144 for disposal (i.e., to not be delivered to consumers). Additionally or alternatively, the controller 150 may indirectly control the gateway by activating an indicator (e.g., a light or buzzer) near the gateway 140, indicating to an operator whether the operator should move exiting food to the container 142 for packing for delivery to consumers or to the container 144 for disposal.

The controller 150 may also receive information from reference sensor devices 170A and 170B regarding process parameters. The reference sensor devices may be configured to sense process parameters at locations where characteristics of the stream of process water are carefully controlled so that the calibration of the calibrated reference sensor may be relied upon. The controller 150 may then use information from the reference sensor devices to calibrate the information received from the sensors 160A, 160B, 162A, and 162B.

As shown, one or both of the food processing stages 104A and 104B may include process water supplies 106A and 106B, for providing and/or containing the process water used within the food processing system 100. As discussed above, the process water supplies 106A and 106B may refer to tanks, reservoirs, and/or accumulation zones of the process water used within the food processing system 100, as shown in FIG. 1. Additionally or alternatively, a process water supply may refer generally to the process water included within and circulated throughout the food processing system 100, such as in a food processing system without a tank, reservoir, or accumulation zone. The first water control system 102A may be used with the first food processing stage 104A to monitor and control the process water used in the first water control system (e.g., supplied from the first process water supply 106A), and the second water control system 102B may be used with the second food processing stage 104B to monitor and control the process water used in the first water control system (e.g., supplied from the second process water supply 106B).

The first food processing stage 104A includes a food wash zone 110A for washing food with the process water from the process water supply 106A. Food may enter the food wash zone 110A at an entry point 112A, flow through the food wash zone 110A, and exit at an exit point 114A. The food wash zone 110A may include a turbulence zone 116A, through which the food flows, to facilitate washing of the food. A dewatering zone 118A (e.g., screening zone), downstream of the food wash zone 110A, is included within or is used in cooperation with the food processing stage 104A. When the food exits the food wash zone 110A, the food may enter the dewatering zone 118A to separate the food from the process water. The process water may then enter into the process water supply 106A, while the food may continue to the food wash zone 110B of the second food processing stage 104B. Further, when the food exits the dewatering zone 118A and/or enters the food wash zone 110B, the food may be rinsed, such as by a spray bar 120A. In this embodiment, the process water from the second process water supply 106B may be sprayed through the spray bar 120A to rinse the food entering the food wash zone 110B, though other water or the process water from the first process water supply 106A may be used to rinse the food.

Similar to the first food processing stage 104A, the second food processing stage 104B may include a food wash zone 110B for washing food with process water from the process water supply 106B. Food may enter the food wash zone 110B at an entry point 112B after exiting the dewatering zone 118A, flow through the food wash zone 110B, and exit at an exit point 114B. The food wash zone 110B may also include a turbulence zone 116B through which the food flows through to facilitate washing of the food.

A dewatering zone 118B (e.g., screening zone) is included within or is used in cooperation with the second food processing stage 104B downstream of the food wash zone 110B. When the food exits the food wash zone 110B, the food enters the dewatering zone 118B to separate the food from the process water. The process water may enter the process water supply 106B, while the food may continue further down through the food processing system 100, or may exit the food processing system 100. Further, when the food exits the food wash zone 110B and/or enters the dewatering zone 118B, the food may be rinsed, such as using a spray bar 120B. In this embodiment, fresh process water, separate from the process water supplies 106A and 106B, may be used to rinse the food. However, the present disclosure is not so limited, as process water from either of the process water supplies 106A and 106B may be used to rinse the food. Accordingly, the food generally follows the arrows depicted in FIG. 1 when flowing through the food processing system 100.

One or more pumps may be included within the food processing stages 104A and 104B for pumping the process water within the food processing stages 104A and 104B, between the food processing stages 104A and 104B, into the food processing stages 104A and 104B, and/or out of the food processing stages 104A and 104B. For example, with respect to the first food processing stage 104A, one or more pumps may be included to pump the process fluid from the process water supply 106A to the food wash zone 110A. A first pump 122A may be used to pump the process water from the process water supply 106A to the entry point 112A of the food wash zone 110A, and a second pump 124A may be used to pump the process water from the process water supply 106A to the turbulence zone 116A of the food wash zone 110A.

In the food processing system 100 illustrated in FIG. 1, the water control system 102A is shown as positioned between or in fluid communication with the process fluid pumped by the pump 122A to the entry point 112A of the food wash zone 110A. However, the present disclosure is not so limited, as the water control system 102A may be positioned anywhere within the food processing system 100. That is, the water control system 102A may be in fluid communication with any desired portion of the food processing system 100 to receive samples of any of the process water used within the food processing system 100. The water control system 102A measures one or more properties of the process water used within the food processing system 100. In some embodiments, the water control system 102A may measure properties of the process water used within the food processing stage 104A. The water control system 102A may be used to compare the measured properties of the process water with predetermined or desired values for the process water, and the water control system 102A may then be able to add chemicals, raise or lower the temperature, and/or make other adjustments to the process water, according to aspects of the present disclosure.

For example, as food is processed through the food processing stage 104A and clean water is added to the food processing stage 104A, the process water may become diluted and thus have a lower concentration of desired chemicals. The water control system 102A may be used to monitor and measure one or more properties of the process water used within the food processing system 100, such as via a sensor (discussed more below), and then determine and add a concentrated wash solution into the process water based upon the measured property of the process water. In an embodiment in which the water control system 102A is used to monitor and measure chlorine concentration and/or pH within the process water, the concentrated wash solution may include one or more of a concentrated chlorine solution, a concentrated acidic solution, and/or a concentrated basic solution.

In certain aspects of the present disclosure, the water control system 102A may include or be used with a pump 108A for pumping the concentrated wash solution 105A (e.g., from a reservoir 109A) into the process water. In the example of FIG. 1, the water control system 102A is used to control pumping of the concentrated wash solution 105A into the process water via the process water supply 106A. The water control system 102A may also include a control unit that receives a signal from the sensors 160A, 160B, 162A, or 162B, in which the control unit may generate a control signal 107A for adding the concentrated wash solution 105A to the process water. The control unit may be used to determine and control an amount of concentrated wash solution 105A to add to the process water, a time interval for pumping the concentrated wash solution 105A into the process water, and/or a rate for pumping the concentrated wash solution 105A into the process water.

The water control systems 102A and 102B may be configured to receive and/or store user input data, as well as historical databases and analyses that may be used to generate the control signal(s). The control signal(s) may also be generated based on the collected data, stored data, analysis, user input, a combination of data types, and/or other related data. Further, the control signal(s) may also be generated for removal of fouling of the sensors and related components based on the collected data, stored data, analysis, user input, a combination thereof, and/or other related data. Additionally, the control signals may further include scheduling the removal of the fouling based on the collected data, stored data, analysis, user input, a combination thereof, and/or other related data.

According to one or more cases, a number of elements are included in the water control systems 102A and 102B for a value-added food processing system 100. Some of these elements may relate to monitoring process water attributes, while others may relate to the performance of items used for monitoring the water attributes. Other elements may relate to monitoring the status of the processing of the food. For example, in some cases, temperature monitoring for correcting pH measurements and chlorine measurements, based on projected values of both at various temperatures, may be provided.

According to one or more cases, a sensor fouling control device performing fouling removal processes may be included.

Fault trapping in data analysis may be used to monitor the water flow by a pH electrode and a chlorine electrode. In other cases, other fouling control devices such as clean-in-place embodiments may be provided that include flushing an electrode/sensor with a liquid wash solution, such as an acid solution or some other food safe cleaning agent. A single clean-in-place device may be provided that is connected to each electrode such that the device is able to provide the cleaning gas and/or liquid (e.g., air) as described herein. In another case, the clean-in-place device may be configured such that the device may be connected when requested and disconnected from each electrode/sensor when not requested. In another case, each electrode/sensor may have its own specific clean-in-place device connected to the electrode/sensor. The clean-in-place device may therefore contain cleaning solution that is specifically tailored for the electrode/sensor. Moreover, the device may further provide a calibration solution when selected. Additionally, in some cases, when the clean-in-place device provides pressurized gas for cleaning, the pressure may be tailored specifically for the electrode/sensor to which the device is connected.

According to some cases, another element that may be included in the water control system(s) is a relay that stops chlorine addition if the pH exceeds a threshold. For example, facility safety may be enhanced if there is a relay provided that can stop chlorine addition if the pH exceeds 7, which may be defined as a domain outside of the normal operating conditions. Similarly, one may set a lower bound on the pH to prevent or reduce the hazards of chlorine outgassing.

One or more sensors and controllers may be added to a product feed control loop of the food processing system 100 to more stringently control the preceding operations in accordance with one or more cases. Additionally, full feedback may be reported to the controller(s) 150 about the status of product feed to assure that the control relay is not circumvented and prevent inappropriate processing. The controller assesses whether the product feed is as expected given the status of the water chemistry.

According to one or more cases, a proportional-integral-derivative (PID) controller, which may be an example of control unit 150, with, for example, 5 to 10 second control loops may be used to control addition of chemicals to the process water in the food processing system 100. This allows the food processing system 100 to maintain the desired control and consistency in the process water chemistry. The PID controller may further allow for slow and fast acting sanitizer changes and better tuning of control. Further, according to certain aspects, controlling the speed of response provides the control unit 150 the ability to vary the degree of anticipation and response that corresponds with the produce wash equipment specification and/or produce characteristics. For example, cleaning carrots may sometimes be done with a longer response time to chemical amount shifts, while washing onions may involve a faster response to changes detected by one or more sensors. The control unit may set pump frequency and/or rate and stroke length to control the amount of chemical added to the process water, as well as the timing. Further, a time interval may be selected for pumping based on the sensor provided information.

According to one or more cases, sensor fouling mitigation with limited interruption of data for cleaning may be provided that improves the operation of the food processing system 100. According to certain aspects, a number of different elements may be provided that increase effectiveness. For example, switching from an elapsed time clock to a daily clock for chlorine electrode electrochemical cleaning may be provided. This change in clock cycle may ensure that the chlorine electrodes may start each day of production without accumulated fouling.

According to certain aspects, another element that may be provided is feedback to the controller 150 to confirm that a sensor (e.g., a chlorine electrode) was cleaned, allowing verification rather than assuming the cleaning cycle was complete.

Further, according to certain aspects, another element that may be included is a designed-for-purpose filter. This may include a set of cascading filters that may include a first filter connected in series with a second filter. These filters may be of a tangential flow design to extend operating time. This may allow greater tolerance for interfering materials including fats and oils that are present in meat (e.g., poultry) operations.

Further, with respect to the second food processing stage 104B, one or more pumps may be included to pump the process fluid from the process water supply 106B to the food wash zone 110B. A first pump 122B may be used to pump the process water from the process water supply 106B to the entry point 112B of the food wash zone 110B, and a second pump 124B may be used to pump the process water from the process water supply 106B to the turbulence zone 116B of the food wash zone 110B. Though not so limited, the second water control system 102B, which may be similar to the first water control system 102A, may be positioned between or in fluid communication with the process fluid pumped by the pump 122B to the entry point 112B of the food wash zone 110B.

In certain aspects of the present disclosure, the food processing system 100 may include a process water supply cooling element 126, such as a chiller, to cool the process water to a predetermined temperature to facilitate processing of the food through the food processing system 100. In an aspect in which multiple food processing stages are used to process food, the stages may utilize different temperatures or ranges to facilitate the food processing. In the aspect of FIG. 1, the process water supply cooling element 126 is shown as included within the second food processing stage 104B, though the process water supply cooling element 126 may additionally or alternatively be included within the first food processing stage 104A and/or other stages. The process water supply cooling element 126 may receive the process water from the process water supply 106B, such as through a pump 128A, cool the process water, and then provide or pump the chilled process water back to the process water supply 106B through a pump 128B (or to another portion of the second food processing stage 104B). In such an aspect, the process water of the second food processing stage 104B may be cooled to or maintained at a temperature between about 34° F. and about 45° F. Further, the process water of the first food processing stage 104A may be cooled to or maintained at a temperature between about 60° F. and about 70° F. Thus, the process water used in the first food processing stage 104A may be maintained at a different temperature or temperature range than the process water used in the second food processing stage 104B.

The food processing system 100 may be used to process any type of food product, but particularly may be used for processing dairy products, protein-based foods, or protein-dense foods. More particularly, the food processing system may be used to process meat, such as fish or poultry. These foods may be particularly dense with lipids and/or other adhering materials, which may foul and/or otherwise negatively affect the water control systems 102A and 102B and sensors included therein. Lipid fouling may be difficult to mitigate, as lipids tend to be oily and waxy, may deposit on surfaces, and may occlude filters. The lipids may restrict flow in lines (e.g., pipes) and otherwise throughout the food processing system 100 and may cover measuring surfaces of the water control systems 102A and 102B. For example, as lipids from poultry (e.g., fat, though oil and other organic compounds are considered) tend to have a similar bulk density as water, filtration of the lipid from the water may be difficult or inadequate, such as when conditioning or filtering process water.

Lipids in process water may clump together in tanks and conveyance systems, accumulate on the interior of tubing, orifices, and instrumentation, and/or prevent the accurate measurement of flow rates and other properties of the process water and the food within the food processing system 100. Further, colder temperatures, such as presented through the process water supply cooling element 126, tend to increase the fouling caused by lipids, such as fouling of sensors in the water control systems 102A and 102B within the food processing system 100. In an aspect in which the water control systems 102A and 102B are used for monitoring chlorine and/or pH levels within the food processing system 100, the accuracy of the sensors included within the water control systems 102A and 102B may become unacceptable or inaccurate (e.g., outside of industry standards) in as little as one hour of use. The lipids, such as poultry fat, may accumulate on the sensor (e.g., an electrode), such that the sensor is insulated or blinded by the lipid accumulation on the sensor, which may cause the sensor to make inaccurate measurements. If the sensor is providing inaccurate measurements, the water control systems 102A and 102B may not be able to accurately and actively control chlorine and/or pH levels for the process water within the food processing system 100.

For example, the water control systems 102A and 102B may not actively be able to control the hygiene of the food, the process water, or the equipment within the food processing system 100 due to the water control systems over- or under-dosing additions of chlorine and acid (e.g., to alter pH of the process water) to the process water. This may result in gassing (e.g., release of noxious gases from the process water) within the food processing system, building evacuation, food or product losses, processing or production stoppages, and/or other health or safety issues. Further, while manual intervention may be relied upon to clean the sensors of the water control systems 102A and 102B, manual intervention may be too labor-intensive, may still lead to processing or production stoppages, and otherwise may be inefficient or ineffective.

Example Validating Wash Processes and Related Operations for Food Processing Validation is a process to show that the desired process is achieved. Verification is another procedure and relates to confirming that the validated process is being used. Generally, an automated controller—such as described in U.S. Patent Application Publication No. 2017/0156390 to Brennan et al., filed on Jul. 13, 2016 and entitled "Short-term Wash Treatment of Produce," which is incorporated herein by reference in its entirety—is necessary to fully achieve the statistical confidence as manual operations react slower to deviations. The preventative control measures are achieved when the automated controller stops processing food, for example, because a process deviation (e.g., a process parameter is outside of specified boundaries) is expected or has occurred. Nevertheless, enough manpower can achieve reasonable validation and verification with manual execution.

According to aspects of the present disclosure, to validate a process, it is desirable to have a process metric or goal and to be able to track the process control variables. These process control variables may be used to verify that the process was done during regular operations. The relative youth of the fresh cut industry and the absence of a kill step has limited consensus as to how to measure process performance and what parameters are desirable to control the process.

In discussions of validation, the concept of worst case is often raised as a condition for a useful validation. Unfortunately, the worst-case conditions may be indeterminate. That is, one can always do worse. A system can be overloaded with product or contamination such that the process is doomed to fail. Given the difficulties in actually identifying the expected worst-case conditions, the process may be validated over a period of time (i.e., a window) that encompasses all of the expected operating conditions, in accordance with aspects of the present disclosure. A standard of meeting all expected operating conditions may be more appropriate than a standard of validating a process under worst-case conditions. This implies that a validation experiment is not a single determination, but a series of determinations that cover a normal range of operations. One approach to determining the proper duration for validation is to determine a period of time during which the observed variance is unchanging during normal operations. This period may be determined statistically by examining the variance in operating parameters (e.g., about 4 hours) for a fresh cut line, such as an automated control line for food processing described herein. If for all instances during this period, the performance meets the desired standard, the process is capable of meeting the objectives and may therefore be considered a valid process.

According to aspects of the present disclosure, cross-contamination control or prevention is a widely accepted process metric, but there is not a universally recognized procedure for measurement. Therefore, there is no universally recognized standard for what is meant by significantly minimizing or preventing cross-contamination. There have been a number of studies reported in the literature, but the methods of these studies typically rely on introducing artificial or bacterial surrogates into a process stream, which is probably not a best practice and still lacks governmental endorsement. As with most microbial measurements, the results will typically depend on the effort applied to obtaining a result. Increasing sample sizes and shifting to most probable number (MPN) methods can increase sensitivity by several orders of magnitude and thus cause a demonstration of preventing cross-contamination to fail. The contamination pressure may also affect the observed level of cross-contamination. Without a standard basis of comparison, performance comparisons are likely to be flawed.

The development of cross-contamination metrics is an active area for research and development. Researchers have used various model systems with bacteria. At least one company is promoting coated oligonucleotides as nonliving surrogates for lethality and cross-contamination measurement. Researchers are also developing alternative nonliving surrogates for the same purposes. At least one company is working to develop an aerobic plate count (APC)-based cross-contamination metric based on an artificial capture system. With no definitive method selected, processors may choose an approach that best meets their objectives.

In aspects of the present disclosure, a definition of significantly minimizing cross-contamination is a reasonable first step. An example definition could be "providing a three-log reduction of cross-contamination relative to the cross-contamination observed with potable water." This definition or a similar definition is an effort to be performance-based rather than prescriptive.

According to aspects of the present disclosure, concentration of free active chlorine in wash water is among the most important process parameters for significantly minimizing cross-contamination. Concentration of free active chlorine may be best measured by measuring pH and free chlorine. These two measurements are analogous to measuring time and temperature for a thermal process. In both cases, all of the other factors may relate to conditions that would prevent the desired process from being achieved. Organic load is often suggested as a process parameter. In truth, its importance is driven by an inability to maintain the free active chlorine when the organic load stresses the system too far. If free active chlorine is maintained, no loss in cross-contamination control is observed even at high organic loads. Temperature is also suggested as a process control parameter. Low wash temperatures are important for quality. Higher temperatures improve sanitizer effectiveness. This situation may be self-correcting over the range (e.g., temperature range) of interest.

With regards to validation, the literature can provide guidance about critical values for the two process parameters (i.e., pH and free chlorine), but such guidance has limited predictive value when considering the performance of a specific style of processing line for the processing of a specific product. The literature cannot map a process line to confirm that the critical values have been achieved throughout the process. The literature also cannot assess the precision and accuracy of the process parameters to determine the desired margins between operating levels and critical control levels. Actual validation assessments should be used to validate a fresh cut process.

In aspects of the present disclosure, single-pass wash systems have the potential to be a special case, if it can be shown that there is no potential for cross-contamination. There are at least three modes of cross-contamination:

product to product, product to water to product, and product to surface to product. In all cases, there may be a small layer of boundary water where a sanitizer might provide control. Until a system is validated to have no cross-contamination risk, it may be imprudent to avoid the use of an appropriate sanitizer. The critical level for a single-pass system is not necessarily the same as for a recirculating system. However, it is reasonable to expect a critical level to exist.

The process and procedure of validation and verification may be usefully divided into four aspects that can be discussed separately to aid the reader in understanding the present disclosure. After describing these four aspects, an approach to assembling the aspects in validation and how to verify that the process is performing correctly are described.

First, it is desirable for a process to have clear objectives. For the purposes of the present disclosure, the description will focus on safety objectives, but aspects of the present disclosure will apply to other measures of performance. These objectives should be objective to the extent that a process either meets the objective or the process does not meet the objective. For continuous metrics, if a value is not selected as the measure of success, then it may be impossible to validate a process. The idea that a process should be as good as possible is inconsistent with the concept of validation. It is desirable for a selection to be made regarding how good a process is desired to be.

Second, it is desirable for the process parameters and the boundaries or critical levels for the key process parameters to be known. Without knowledge of the process parameters, one may not be able to determine how a process is performing. The knowledge about what is critical to control is even more specific. It should be noted that without process objectives, it may not be possible to determine critical levels.

Third, it is desirable for systems to be in place to track and control the process parameters. Knowledge regarding how well this is done and can be done may be used to drive decisions about operating limits and margins of safety between critical levels and operating levels. In thermal processing (an example of a relatively static process), one considers cold spots where product might not receive the desired amount of heat. In relatively dynamic processes such as those under consideration here, locations that deviate from the desired process parameters may allow unsafe product to be mingled with the bulk of the product. Thus, it is desirable for the key process parameters to be mapped throughout the food processing line. It is also desirable for process variance to be understood throughout both times and locations of the food processing line.

Fourth, for dynamic processes, validation is not a one-and-done proposition. It may be desirable to determine the window over which one should ensure that a valid process was performed so as to ensure that all reasonable process conditions are included. Historic data and/or data from similar operations may be used to objectively establish an appropriate validation window. True validation of a dynamic system is more than a single point in time under a single set of conditions. Without this knowledge, a process cannot be classified as in control or out of control. Without control, there can be no verification.

Each of the above-mentioned aspects is described in greater detail below.

Example Process Metrics

It is desirable to define a purpose for most processes. The goal for many thermal processes is to kill some number of the target organism, which is usually the most difficult pathogen to kill and hence the toughest problem to solve. In a process without a kill step with very low concentrations of pathogens, the most challenging problem is typically not a specific pathogen, but instead any pathogen. For processes besides wash processes, the objective may be something else, such as controlling browning or removing heat, but this should be done without causing problems with pathogens. The usual pathogens for leafy greens are hemolytic *E. coli* or *Salmonella*. However, for aspects of the present disclosure, any species could be the target. Fortunately, these non-traditional processes may generally only consider vegetative cells and perhaps viruses. Spore-forming organisms are expected to be beyond the reach of these non-traditional processes.

For a thermal process with a kill step, the usual process metric is the statistical removal of all pathogens within a particular product, such as in a can, in a bottle, or in a continuous cook for a product that is packed aseptically. This statistical removal of all pathogens is usually done with a process that provides a known level of lethality (e.g., a 5 log kill for juice products). If the contamination load on the food exceeds the capabilities of the designed process, a failure may occur. If the product is inhomogeneous, it is desirable to identify the portion with the slowest heat penetration, where heat is least effective. The science behind this metric is well-developed and is beyond the scope of the present disclosure. With heat penetration studies and inoculated packs, the thermal processing sector of the food industry has virtually no process failures. With very few exceptions, problems relate to a failure to execute the validated process or package failures. If investigated, these failures would typically be verification failures rather than demonstrations that the validated process did not work.

According to aspects of the present disclosure, there are an almost limitless number of potential process metrics that can be considered for a wash process. Specific values can be changed. Organisms and products can be changed. However, the general structures will be relatively similar. At some point, the Food and Drug Administration (FDA) may recognize some metric either directly or by accepting a validation based on a performance metric. The FDA may effectively accept more than one metric. Some relatively specific examples of such metrics are provided below:

1) Less than an average of 1 colony forming unit (CFU) per gram (CFU/g) by most probable number (MPN) analysis on iceberg lettuce cross-contaminated with 2% spinach inoculated at more than 104 CFU/g of generic *E. coli;*
2) Greater than 90% Non-Detects (N.D.s) with a detection limit of 10 CFU/g on sliced romaine lettuce cross-contaminated with a 2% spinach inoculated at more than 104 CFU/g of generic *E. coli;*
3) Reducing the recovered *E. coli* to less than 10 CFU/g on iceberg lettuce from a more than 104 CFU/g inoculation of *E. coli*; or
4) Demonstrating greater than a 3 log reduction in a 105 inoculation with *E. coli* on Romaine lettuce.

Returning to the original premise, a way to measure or monitor performance is desirable in order to validate or verify a process, and it is desirable to use the same tool to determine the most difficult or challenging conditions in the absence of a large body of science and experience. The circular nature of this argument should be apparent to one skilled in the art. Furthermore, it is tempting to assume that this measurement may be qualitative or quantitative. Controlling cross-contamination or preventing cross-contamination would seem to be examples of qualitative metrics. For better or worse, qualitative standards ultimately become quantitative standards, because there is a limit of detection or sensitivity inherent to any measurement. It is desirable to define the test or conditions where a qualitative standard is met in order to make a determination of whether the qualitative standard is met.

In aspects of the present disclosure, for produce wash processes, one generally accepted metric or measure of success relates to the control of cross-contamination in which a performance metric is selected to assure that the wash process does no harm while removing dirt and other undesirable material.

According to aspects of the present disclosure, cross-contamination is a process whereby one colony of a pathogen can be spread across more product. More specifically, in a leafy green wash system, cross-contamination is the migration of bacterial pathogens from one leaf to another.

By way of example, most of the following discussion will focus on cross-contamination control as the normal metric of choice for wash systems. However, valid arguments can be made for using lethality, as is used for thermal processing. Unfortunately, wash processes do not have sufficient lethality to provide a kill step, where one can consider the statistical absence of pathogens as the performance metric, unless one assumes a very low initial load. However, given average low initial pathogen levels with raw material control, a lethality metric may be useful and is considered below as a performance metric for wash processes, according to aspects of the present disclosure.

Ideally, an assay for cross-contamination would yield an absolute and definitive result that would apply to any wash system. Unfortunately, such an assay does not exist, but there are a number of strategies to generate comparative data that are considered here as laying the foundations for validation and verification activities. In the absence of consensus as to the appropriate strategy, it is desirable to make a choice that allows the most appropriate validation and verification possible. This same type of development applies with wash systems for other products and other water-based treatments.

According to aspects of the present disclosure, there are at least three potential transfer mechanisms of cross-contamination in food wash systems for treating leafy green produce:

1) Water-mediated transfer;
2) Direct transfer; and
3) Surface-mediated transfer.

In aspects of the present disclosure, the above three potential transfer mechanisms of cross-contamination may be assembled in various ways to yield a number of paths for a pathogen to travel between leaves, but these various paths typically only come into consideration for kinetic modeling.

According to aspects of the present disclosure, water-mediated transfer is the most important cross-contamination mechanism in food wash systems for treating leafy green produce. Water is not excluded from the spaces between leaves of produce even when the leaves seem to be in intimate contact. There are probably boundary conditions beyond which this will not apply, such as an overloading condition where leaves are not wetted. However, such conditions would typically also not remove macro contamination such as dirt and grit. The absence of sufficient water in the overloading condition is likely to cause mechanical damage to the product, also making the process unacceptable. The same types of argument can be made for surface-mediated cross-contamination. Therefore, the present disclosure focuses on water-mediated cross-contamination.

In order to develop an assay, it is desirable to identify the controlling parameters. For cross-contamination in food wash systems, there are a number of candidates for the controlling parameters. These candidates may not have been studied adequately to allow extrapolation across all systems or to have consensus regarding those candidates that are unimportant. This is a distinction from thermal processing, where models allow useful transfer of results between systems. However, if all of the candidates are controlled either inherently or by design, one may generate comparable data, which is useful for decision making. Ultimately, the value of such data measuring cross-contamination may be determined by the data's applicability to the actual processes under study. A list of candidates of controlling parameters includes:

1) The carrier or product that is the source of contaminant;
2) The catcher or product that picks up the contaminant;
3) The selection of contaminant, whether a particular pathogen or a surrogate;
4) The concentration or level of the contaminant on a carrier (e.g., a carrier of the contaminant);
5) The ratio of the carrier to the catcher;
6) The ratio of product to migration medium, generally water;
7) The migration medium, generally water at a specific temperature, pH, organic load, hardness, and turbidity;
8) The concentration of any control agent, such as chlorine or another antimicrobial; and
9) The configuration of the system including mean path, agitation, and time of potential transfer.

According to aspects of the present disclosure, consideration of the strengths and weaknesses of various assay strategies in light of these candidate parameters may be instructive. Making an assay conform to a commercial process in all nine candidate parameters essentially involves performing the test during normal operations of a food processing system, which may not be a reasonable solution. Therefore, compromises may most likely be considered.

In aspects of the present disclosure, it may be important to consider the desired sensitivity of an assay. The concept of zero or none is largely incompatible with microbiological assays. Therefore, one may decide what level of cross-contamination is significant and worth measuring. Aspects of the present disclosure examine four approaches for quantifying cross-contamination.

According to aspects of the present disclosure, development of a bench scale metric as a useful metric is explored. For this system, there may be three essential elements:

1) A vessel to contain the transfer medium;
2) A catcher to receive the cross-contamination; and
3) A carrier with the contamination.

In the above-described simple system, there are a number of controlling parameters that are difficult to control, but experiments are easy to execute in this simple system, because of its simplicity. One can picture putting a known amount of water in the vessel with a known amount of product (e.g., romaine lettuce, iceberg lettuce, or other food), adding the carrier with the contamination for a short time, and measuring the level of contamination on the product. The data may be reported as CFU/g on the product by the contaminant. One can imagine increasing the chlorine level until no cross-contamination is observed. However, this simple approach ignores some complications and parameters that it is desirable to control:

1) The product is expected to change the composition of the transfer medium and may react with the sanitizer in the transfer medium, particularly if the sanitizer is an oxidant, like chlorine or an active oxygen species. This is particularly true when the product is cut or chopped and adds reactive solutes to the transfer medium.
2) The product does not flow towards increasingly clean water as in a counter flow wash system, and the level of agitation and mixing is not specified or well-controlled.
3) The CFU/g response of this assay will be dependent on the consistency of the contamination level, which is affected by the ratio of product to contaminant. Knowing the relationship of these parameters might allow better extrapolation to actual food processing systems (e.g., wash lines).
4) A non-detect response for this assay may have very little relationship to control of cross-contamination in a wash line, because of the differences in scale.
5) The detection limit of this and most assays will be somewhat arbitrary. Direct plating will have a nominal detection limit of 5 to 10 CFU/g for leafy green samples. However, presence-or-absence assays can easily increase the sensitivity and provide quantitation with most probable number (MPN) protocols. With MPN protocols, one skilled in the art may easily achieve detection limits of 0.05 CFU/g. Lower levels are possible with larger samples.

According to aspects of the present disclosure, the above-described bench scale type of system is very useful for establishing that a critical level exists and for exploring interactions between various parameters. Being bench scale, this approach is amenable to using actual pathogens as the contaminant instead of a surrogate. Transfer medium conditions are particularly accessible. It is also interesting to examine the degree of intimacy between the carrier and the catcher. It is easy to package the carrier and catcher in permeable netting and control the spacing. However, care should be taken to ensure that the initial conditions apply to the entire period of the test. In aspects of the present disclosure, key learnings from this type of experiment relate to which parameters relate to the worst-case conditions and which parameters may be safely ignored. Ultimately, it is desirable to validate such efforts at a larger scale to be applied to food wash systems.

Increasing the scale of the test bed addresses some of these concerns. Using an older style "Product in Tote" (PIT) wash system, the amount of wash medium is greatly increased relative to a bench scale system, constant agitation is added, and steady state control of the water chemistry may be achieved with suitable equipment. An ASAP™ from SmartWash Solutions, LLC is one approach for controlling the water chemistry. The larger scale allows larger amounts of product to be tested and therefore enables the tests to be more relevant.

According to aspects of the present disclosure, the level of turbidity is a minor factor, and the lethality associated with some of the spent process waters tested was greater than fresh water samples. Again, larger scale experiments may validate these learnings in actual wash systems, but the larger scale system mentioned above is a closer match to commercial conditions.

In aspects of the present disclosure, passing a distinctive and sterile catcher through a commercial wash system may be used to validate a food processing system. An example of distinctive and sterile catcher is the interior of various root vegetables. It is postulated that a sterile catcher will collect wild organisms through cross-contamination as the sterile catcher passes through the flume with product. This approach has the potential to directly validate a process during commercial operation. However, it is generally not prudent to run a process under the worst-case conditions, so it is desirable that a range of conditions be examined and used to thereby determine a range of acceptable processes. A challenge with this approach is that the starting wild contamination is highly variable in both concentration and the mix of species. With this variable starting point, it is not possible to compare results across systems, which limits this approach. Furthermore, it is desirable for this surrogate test to be calibrated, or at least for a detection level to be determined. This approach may help confirm that a process performs similar to a validated process. In other words, this approach may extend the reach of other validation studies. Similar benefits may be achieved with other non-living surrogates such as SafeTraces™, a non-living deoxyribonucleic acid (DNA) product formulated to mimic bacterial behavior. It is interesting to consider an assay where all the product is inoculated and migration to these catchers is measured.

Building on the experience with these smaller systems, it becomes apparent that the most relevant assay of cross-contamination may entail a full-scale pilot plant where most of the parameters are inherently those of the wash system to be validated and verified. According to aspects of the present disclosure, a full-scale pilot plant including SmartWash Solutions SW™ or SWO™ as wash adjuvants and chlorine as the antimicrobial. One skilled in the art may readily adapt the assay to other chemistries. For a two-float-tank process with iceberg lettuce or romaine lettuce as the catcher and spinach or a red leaf lettuce as the carrier, the table below lists a reduced set of parameters as the independent or adjustable variables for an assay and the experimental variables for study (suggested ranges are also listed). Some additional parameters included below are of secondary importance and can therefore be allowed to vary.

| Variable | Type | Suggested Range |
|---|---|---|
| Product feed rate | Assay | 25-50 pounds per minute, as much as practical with manual feeding |
| Carrier feed rate | Assay | 1-10% of product feed rate, more than would occur in steady state in production |
| Carrier Inoculum | Assay | $10^3$ to $10^5$ CFU/g of generic *E. coli*, but other organisms or surrogates could be used |
| pH | Experimental | 4-6.5 ensuring largely hypochlorous acid, but for test purposes other values may be used |
| Free chlorine | Experimental | 2-20 ppm is a typical range, but zero chlorine is an interesting positive control |
| SW | Experimental | 0-2% depending on the experiment |
| Organic Load (Turbidity) | Secondary | 0-400 nephelometric turbidity units (NTU) |
| Temperature | Secondary | 31-54° F. |
| Hardness | Secondary | As long as the water is potable, no limitations have been observed |

To test for cross-contamination in aspects of the present disclosure, the product should be segregated from the carrier without reintroducing contamination after the process. This may involve active collection of just the appropriate leaves. The product may be stomached 1:5 or 1:10 with a neutral buffer. The extract is generally plated on appropriate media, such as Petrifilm™. An MPN assay may also be done if greater sensitivity is desired. One hundred milliliter traytype MPN assays are especially useful for this purpose. No recovered organisms with the sanitizer regime under study, when organisms are recovered when the sanitizer is absent, indicates some level of cross-contamination control.

According to aspects of the present disclosure, a similar assay may be developed for lethality starting with bench-scale experiments and scaling up to full production scale. Again, organism selection (pathogens versus surrogates) is to be considered for determining validity of the assay. The process typically devolves to measuring a starting concentration and a post-process concentration. The kill process is generally thought to be first order, so the log of the ratio of initial to final concentrations is a measure of lethality. The challenges are largely the same. There is an appeal to working in a commercial environment to truly be applicable, but in the commercial environment there are other limitations. The reproducibility from experiment to experiment may be lacking for the simple choices, and the number of samples indicated to get statistically valid measurements is often prohibitive.

Nevertheless, it is clear that one may develop metrics for cross-contamination control and for lethality, depending on what compromises are selected as least onerous. Each of the above analytical approaches has limitations and advantages. Ultimately, their utility depends on how well the approaches predict what would happen on a commercial line when the commercial line is challenged. Again, the same logic may apply to other processing objectives.

Example Process Parameters and Critical Levels

According to aspects of the present disclosure, an understanding of the key control parameters that describe the operational status of a process to be validated may be critical to validation and verification. For a traditional thermal process, these parameters are time and temperature. Geometry is typically considered an implementation problem and is typically not a parameter that changes for a particular line. One seeks to achieve the desired process throughout the product irrespective of the geometry by developing a process for the geometry. Thus, geometry is not a control parameter in aspects of the present disclosure. For a wash process, such as is used to process leafy greens, pH, chlorine level, and temperature are the corresponding control parameters. These control parameters will ultimately be the metrics to confirm that a process is running properly as part of a verification program. If a process can fail with the selected control parameters under control with all other known parameters in their nominal ranges, there is another uncontrolled control parameter that should be addressed in a new validation analysis. Such deviations may relate to operating outside of the expected process in terms of things such as product flow, water hardness, soil load, or when there is a maintenance issue that was not considered critical. Under these conditions, the new knowledge regarding this newly identified control parameter should be captured for a future validation effort. A process should be reviewed periodically to assure that the process is performing as expected. In other words, validation is not a one-time process, but is something that should be confirmed periodically. Validation of a dynamic wash process is not a one-and-done proposition. In some cases, parameters that would normally be considered secondary factors may become primary factors. This often occurs with innovative products or packages that necessitate innovative processes.

It is desirable to determine values for key parameters that represent the boundaries of a valid process or to know the range over which these parameters will vary under normal operating conditions in order to validate the process having those normal operating conditions. In actual practice, a validation approach may meld this information. For example, if a thermally processed product is under-cooked, then the product was not produced with a valid process (e.g., the time×temperature product was insufficient). Similarly, for a wash process and other related processes, there will be specific values associated with the controlling parameters that lead to acceptable processes and therefore set the conditions of validation. This knowledge may be specific to each processing line or each product and may have seasonal variation associated therewith. It can be hoped that with more research, the scientific foundations for these non-traditional processes will improve and provide guidance for developing new processes and extending validation efforts beyond the line(s) where the work was completed.

In aspects of the present disclosure, for a typical wash process, a list of the parameters that may be controlled as part of both process verification or process validation includes:

1) pH;
2) chlorine concentration and form (e.g., free active chlorine);
3) product feed rate;
4) temperature of the wash water;
5) product (more than one product may be processed on a line);
6) residence time or flow in process (in the drive to maximize throughput, operators may adjust turbulence and water circulation of the wash process to change these parameters);
7) water management parameters (e.g., recycling rate and make-up rates); and
8) water chemistry (e.g., acidulants and adjuvants).

The above list includes the key parameters mentioned above (i.e., chlorine, pH and temperature), but also includes other more-or-less-fixed parameters that may affect the outcome of a wash process. One may either confirm that a range for these variables provides an acceptable process or determine a boundary condition that marks the limit of valid processes.

Although the discussion above identifies the key process parameters for a typical wash line, such determinations generally involve the selection of one or more assays of process performance and/or the associated performance metrics. Once the list of key parameters is obtained, one may establish the critical levels for these parameters. A person skilled in the art will recognize that there is often a recursive process of refining the process metrics and determining the key control parameters and their critical limits.

According to aspects of the present disclosure, changing the assay or the performance metric might yield a different set of critical levels for the various parameters, unless there is a corresponding change in the goal associated with the metric. For example, a two-fold increase in either the inoculation level or in the carrier feed rate would be expected to cause a similar impact on the observed levels of cross-contamination and implicate an increase in some of the critical levels to achieve the same apparent level of control. The effect of these changes on cross-contamination is not inherently linear, and the impact on each critical level may be less likely to be linear. The defining of the assay along the lines discussed above may most likely be paramount to determining the critical levels.

In aspects of the present disclosure, there may not be a single critical level. There may be a set of critical levels or a set of parameter ranges associated with a set of critical levels. For example, in washing leafy greens, a concentration of chlorine that is sufficient to prevent cross-contamination to some level may only be sufficient under a particular set of conditions. This set of conditions may include a range for some parameters, but this range may not inherently apply to all conditions that could occur.

It is instructive to consider a set of boundary conditions as an example. Some have expressed a desire to designate 10 ppm of free chlorine as the critical level for controlling cross-contamination. In aspects of the present disclosure, there are at least two other parameters that may be specified as qualifiers to consider in determining this hypothetical critical limit, even after a performance metric is selected. First, it is well-known that chlorine efficacy is a function of pH: hypochlorite ions are much less effective than hypochlorous acid at killing bacteria. Therefore, a pH range is an expected qualifier for consideration for this suggested 10 ppm critical level. Some may argue that this 10 ppm level is high enough that pH no longer matters. This assertion and the fundamental assertion that 10 ppm is the critical level should be demonstrated with data using a performance metric such as those that were previously discussed. A user may select a performance metric in the absence of regulatory guidance. With such a selected performance metric, one could theoretically devise a test to attempt to show that pH does not matter. The present disclosure should not be construed as supporting the assertion that pH does not matter in food processing.

According to aspects of the present disclosure, contamination load is a second qualifying parameter to consider in determining 10 ppm of free chlorine as the critical level. Over a reasonable range, the observed cross-contamination will be a function of contamination load. If the contamination is increased ten-fold, the observed cross-contamination by the performance metric assay would be expected to also increase on the order of ten-fold. The relationship is again not inherently linear, but it is unreasonable to not expect an effect. Therefore, a critical level for chlorine should specify load and response levels.

In aspects of the present disclosure, these same types of arguments may be made for many of the process parameters. It is desirable to specify the range of acceptable levels for each parameter, unless there is data that demonstrates that over the range of interest, a parameter is unimportant. Expressed differently, the critical level for a parameter is typically a function of the other parameters and is not a single number. Given that many of these parameters are inherent to a wash line, it may be appropriate to validate each class of wash line.

According to aspects of the present disclosure, it may be desirable to establish concentration equivalency between various sanitizers.

The table of example parameters below defines an example minimum acceptable process for a particular two-stage line (e.g., the food processing system 100 shown in FIG. 1) to achieve a particular process metric. The listed parameters are the critical values or boundaries and are therefore the process control parameters indicated to achieve the desired example process. Obviously, stronger processes as indicated by ≤ or ≥ are also acceptable. However, it is desirable to ensure that no product receives less than the desired process at any time. Unfortunately, this absolute assurance is not necessarily possible.

In aspects of the present disclosure, a measure of statistical conformance of a process may be achievable. The table below is complete enough to illustrate the process of ensuring that under-processed product is not produced. However, it should be noted that the table below does not include all of the process parameters listed above. In addition, this list of boundary conditions does not inherently include all of the entire range that might occur under normal operating conditions. Additional discussion of the operating window continues below the table.

| Critical Parameter | Boundary Conditions |
|---|---|
| Product feed rate | ≤16,000 pounds per hour |
| Primary pH | 4.5 to 6.5 |
| Primary free chlorine | ≥2 ppm |
| Primary turbidity | ≤1500 NTU |
| Secondary pH | 4.5 to 6.5 |
| Secondary free chlorine | ≥2 ppm |
| Secondary turbidity | ≤1000 NTU |

According to aspects of the present disclosure, there exists a list of parameters to define the status of a process, such that the process can be validated. There is a smaller list of key or critical parameters that it is desirable to monitor and generally control to verify that at a specific time a valid process has been performed.

Example Process Capability

With both process objectives and process parameters in hand, it is desirable to consider the process capabilities. This examination is typically one of studying the error or variance. It is instructive to consider that all quantitative measurements have some error. It is desirable to consider performance variance across time, process control variance across time and across the food processing system (e.g., looking for cold spots in a wash line), and error in any specific determination. These factors may play into the analysis and determination of the safety margins between operating limits and critical values to ensure that all product receives a validated process.

It is desirable to know how well a process line can be controlled under existing practices in order to validate the line can perform a valid process and to verify that the line is performing the valid process. If a line is being operated without an automated control system, it may be tempting to increase the frequency of parameter testing to generate more data in a shorter period of time. Unfortunately, this may have unintended consequences with regards to the apparent process capabilities. Likewise, any data generated before the last significant process change will not be relevant. The amount of historic data desired depends on the degree of confidence one seeks from the validation, which may depend on the analysis discussed below. Unfortunately, if a process line runs radically different kinds of products, the line should probably be validated separately for each different kind of product. This may entail partitioning the parameter results by product type. According to aspects of the present disclosure, different product types are a source of variance that should be accounted for in the validation effort for a food processing system (e.g., a process line).

Almost all measurement problems start with the demand for an accurate reference. The idea that a measurement can be more accurate than the reference is without foundation. This problem has been considered in greater detail elsewhere, such as in U.S. Patent Application Publication No. 2016/0095475 to Brennan et al., filed on Oct. 5, 2015 and entitled "In-Line Sensor Validation System," and International Application PCT/US2018/027673 to Brennan et al., filed on Apr. 13, 2018 and entitled "Portable Sensor Validation System," both of which are incorporated herein by reference in their entireties.

According to aspects of the present disclosure, there is an error range around a measurement of a parameter which defines the possible deviations between the measurement and the "true value" for the parameter.

Turning first to the performance variance, it is important to recognize that for dynamic processes, performance may be measured at more than one point in time to understand the variance. The period across which this variance should be examined is discussed below under the testing window aspect. Ideally, one would have an automated performance metric which would generate data that is arbitrarily close to continuous. Unfortunately, as discussed above, no continuous performance metrics have been identified.

In certain aspects of the present disclosure, 12-20 determinations across the testing window may be considered a useful practical guideline for determining the statistical conformance to the objective.

Examining the process parameters over time is a matter of control charting. It is desirable to focus the effort primarily on the key parameters that are actively controlled. Many of the other parameters are categorical, such as what product is being processed, or part of the standard operating profile (e.g., feed rate). This analysis of the process parameters over time allows determining the mean, standard deviation, and/or other statistical values of each process parameter. The mean, standard deviation, and/or other statistical values may be compared to the actual operating level. This analysis may permit determination as to where the operating limits should be set to statistically ensure that the process remains within the boundaries (e.g., critical values) determined to provide the desired process.

The variance across a food processing stage (e.g., food processing stage 104A, shown in FIG. 1) or other process line can be challenging. Determining variance may, for example, include a search for cold spots in an operating food processing stage. This may be particularly true when the process water should be conditioned prior to passing over the sensor. The measurement of this variance may entail that the key parameters be monitored to some testing window while the regular control system is in operation. The deviations between the observed key parameters at the control system and at various locations around or along the process line may be divided into three categories. First, there may be noise or error in the process. Noise is generally random and may be accepted as inherent in the system. It may be desirable to control for the noise or error in the process by increasing the space between the operation level and the critical level. The second type of deviation is the time offset. For example, it may take some seconds for the water at the control system to reach a site that is being mapped. This variance may already be accounted for in the control parameter control charting discussed above. And, for a reactive species such as chlorine, the distance from the control system may allow consumption of a species generated, which may result in a real difference in the parameter. Here again, it is desirable to adjust the offset between the operating limit and the critical value to ensure that the parameter at the mapped location does not fall below the critical value. This analysis may also have inaccuracies due to mixing (e.g., mixing of product with wash water), as well. It is not generally necessary to continuously collect this data during regular operations, but sufficient data of this type should be collected to understand the inhomogeneity of the process environment.

Because inhomogeneity data may be important to the validation process, special-purpose devices may be very useful in validating a process of a food processing system. In certain aspects of the present disclosure, a device for validating a food process system may include: a system for conditioning the process stream, a pump or other device for moving the process stream past a sensor or sensors, the sensor or sensors, interpretive hardware (e.g., one or more processors) to convert the sensor signals into data, and a logging and reporting system. The last three components may be packaged variously in terms of the actual hardware, so long as the functions are present.

In certain aspects of the present disclosure, a special-purpose device as described above may be an Internet-of-things (IoT) device. If the special-purpose device is not connected to a local network, there are other approaches to transferring the data for analysis. Although it may be possible to record the data manually, this is not generally recommended as this can be a tedious and time-consuming process to collect sufficient data for the analysis discussed below.

As indicated above, this validation approach applies to related processes. In order to evaluate the homogeneity of alternative processes, it may be desirable to employ other monitoring systems. Such systems may be designed to have additional flexibility as indicated below. The specific controller outlined for monitoring chlorine, pH, and temperature is not always appropriate to other monitoring systems, as described in U.S. Patent Application Publication No. 2017/0156390 to Brennan et al., filed on Jul. 13, 2016 and entitled "Short-term Wash Treatment of Produce." Therefore, a series of smaller control units for locations may be desirable. These smaller control systems have the same basic form factor, with the ability to easily replace one with another. It may be desirable to select a control system based on control characteristics, monitor/control values (e.g. chlorine and/or pH), self-sampling, or usage of chemical pumps.

According to aspects of the present disclosure, a reference pair of sensors may be used to calibrate the response of other sensors whose response will correlate with a control parameter. Given the complexities of direct measurement with sensors as outlined above, using a reference pair of sensors may allow for more mapping sensors with less overhead. There are some sensors whose response will correlate with a control parameter. Unfortunately, these sensors may also vary with other potential aspects of the process that may shift during the dynamic process. This limitation may be overcome by having a reference pair of sensors. If a known calibrated sensor is coupled closely with a correlating sensor, the relationship between these two sensors may be used to calibrate the response of other correlating sensors operating at other locations in the process.

In aspects of the present disclosure, other factors affecting the response of the correlating sensors may occur more slowly than the changes in the key parameter.

For example, free active chlorine may be measured with a coulometric sensor. The response of this sensor may be affected by a rate of fluid flow past the coulometric sensor and may involve substantial sensing stream preparation. An oxidation reduction potential (ORP) sensor is a good correlating sensor, but some ORP sensors lack signal stability across the range of expected operating conditions to be useful for control. If, however, such an ORP sensor is closely coupled to the coulometric sensor, values from the coulometric sensor may be used to correct and determine the sensed values for free active chlorine at remote locations where other ORP sensors were placed.

Figure 2:
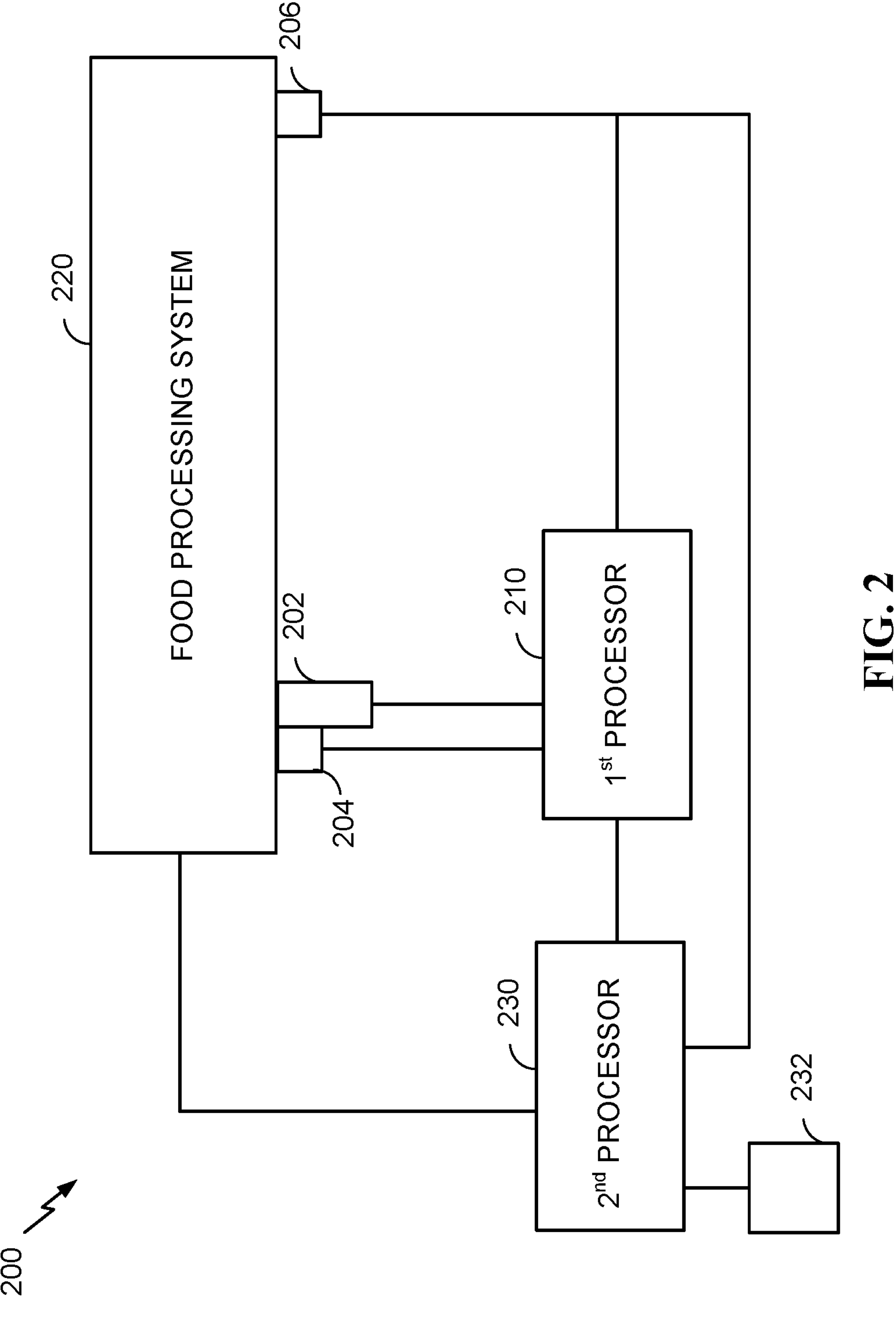
FIG. 2 is a schematic diagram of an example system for validating operation of a food processing system, in accordance with certain aspects of the present disclosure.

FIG. 2 is a schematic diagram of an example system 200 for validating a process for a food processing system 220, verifying the validated process is being used, and/or verifying operation of the food processing system 220. The food processing system 220 may be an example of or similar to the food processing system 100, illustrated in FIG. 1. As illustrated in FIG. 2, the example system 200 includes a first sensor 202 configured to generate a first signal based on a process parameter of the food processing system 220 at a first location. The first sensor may be calibrated. The example system 200 may also include a second sensor 204 configured to generate a second signal based on the process parameter of the food processing system 220 at the first location and a third sensor 206 configured to generate a third signal based on the process parameter of the food processing system 220 at a second location different from the first location. The second sensor 204 and the third sensor 206 may be the same type of sensor and may be a different type than the first sensor 202. The system 200 may also include a first processor 210 configured to: determine a first value of the process parameter at the first location based on at least the first signal; determine a relationship between the first sensor 202 and the second sensor 204 based on the first signal and the second signal; determine a second value of the process parameter at the second location based on the third signal; and adjust the second value of the process parameter at the second location based on the relationship between the first sensor 202 and the second sensor 204.

According to aspects of the present disclosure, the system 200 may monitor (e.g., using the first sensor 202, the second sensor 204, or the third sensor 206) pH of process water, free active chlorine concentration of the process water, and/or temperature levels of the process water in the food processing system 220.

According to aspects of the present disclosure, the system 200 may include means for conditioning the process stream, including filtration designed to prevent pieces of lettuce or other products from plugging lines (e.g., pipes or other conduits) of the food processing system 220 and preventing flow past the sensors 202, 204, and 206.

According to aspects of the present disclosure, the system 200 may include flash drive or other memory technology to log data (e.g., signals from the first sensor 202, the second sensor 204, and/or the third sensor 206) before the data is transferred for analysis.

According to aspects of the present disclosure, values from all sensors may be logged in native form or may be converted on the fly before logging. This conversion is a simple linear transform based on the known relationship between the coupled pair that allows computation of the free active chlorine at the remote locations.

In aspects of the present disclosure, the system 200 may include a second processor 230 configured to receive a first indication of the second value of the process parameter at the second location. The second processor may additionally or alternatively be configured to cause the food processing system 220 to take a first action in response to the second value of the process parameter at the second location being outside of predetermined boundaries.

According to aspects of the present disclosure, the system 200 may also include a memory 232 coupled to the processor 230.

According to aspects of the present disclosure, the processor 230 is configured to cause the food processing system 220 to take the action in response to the second value of the process parameter at the second location being outside of the predetermined boundaries for a particular time window.

In aspects of the present disclosure, the processor 230 may cause the food processing system 220 to halt processing food in response to the second value of the process parameter at the second location being outside of the predetermined boundaries for a particular time window.

In aspects of the present disclosure, the processor 230 may cause the food processing system 220 to adjust one or more control parameters (e.g., a flow rate of chilled water supplied to a chiller of a process water supply) of the food processing system 220 in response to the second value of the process parameter at the second location being outside of the predetermined boundaries for a particular time window According to aspects of the present disclosure, the processor 230 may cause the food processing system 220 to divert (e.g., send to container 144 for disposal in FIG. 1, instead of sending to container 142 for packaging) a food product in response to the second value of the process parameter at the second location being outside of the predetermined boundaries for a particular time window.

In certain aspects of the present disclosure, the processor 210 and the processor 230 may be the same processor. In other words, a single processor may perform the functions of both the processor 210 and the processor 230.

According to certain aspects of the present disclosure, at least one of the first processor or the second processor comprises a process water monitor and control processor.

In aspects of the present disclosure, the second sensor 204 may be an oxidation reduction potential (ORP) sensor.

FIG. 3 is a flow diagram of example operations 300 for verifying operation of a food processing system, in accordance with aspects of the present disclosure. The operations 300 may be performed by a system for validating and/or verifying operation of a food processing system (e.g., the system 200 shown in FIG. 2).

The operations 300 may begin at block 302 by generating, with a first sensor, a first signal based on a process parameter of the food processing system at a first location, wherein the first sensor is calibrated. At block 304, operations 300 continue by generating, with a second sensor, a second signal based on the process parameter of the food processing system at the first location. At block 306, operations 300 continue by generating, with a third sensor, a third signal based on the process parameter of the food processing system at a second location different from the first location, wherein the second sensor and the third sensor are a same type of sensor. At block 308, operations 300 continue by determining a first value of the process parameter at the first location based on at least the first signal. Operations 300 continue at block 310 by determining a relationship between the first sensor and the second sensor based on the first signal and the second signal. At block 312, operations 300 continue by determining a second value of the process parameter at the second location based on the third signal. Operations 300 continue at block 314 by adjusting the second value of the process parameter at the second location based on the relationship between the first sensor and the second sensor.

Example Testing Window

In aspects of the present disclosure, there are two time windows that may be considered for validation. One time window to consider for validation is the "always" time window. If one can continuously or with high frequency show that the process objectives are being met, then the demand for other verification would be eliminated. The validation and the verification would be the same. Unfortunately, as observed in the discussion of process metrics above, a process metric suitable for high frequency testing where rapid response is desired is not available. This means the process parameters that can be measured frequently and with short lag times are recommended for verification.

According to aspects of the present disclosure, another time window for validation is one that encompasses all of the conditions that should be expected to occur while the process is in control.

In aspects of the present disclosure, two tools to identify a time window meeting these specifications are described:

1) Using historic data for key control parameters, one compares the calculated standard deviation of a rolling mean as one increases the time window associated with these rolling means until the standard deviation is constant, or at least constant to a desired level of confidence.
2) Alternatively, one may compare the rolling means of the parameter itself to identify an appropriate window.

According to aspects of the present disclosure, a better approach may rely on both tests, and such tests may be applied to one or more key parameters. In the case of a product wash line, free active chlorine may be a significant parameter. Confirmatory analyses of pH may normally identify a shorter window given the smaller variance. This testing window may be the shortest time that should be considered as appropriate for a validation test of a dynamic process.

Figure 4:
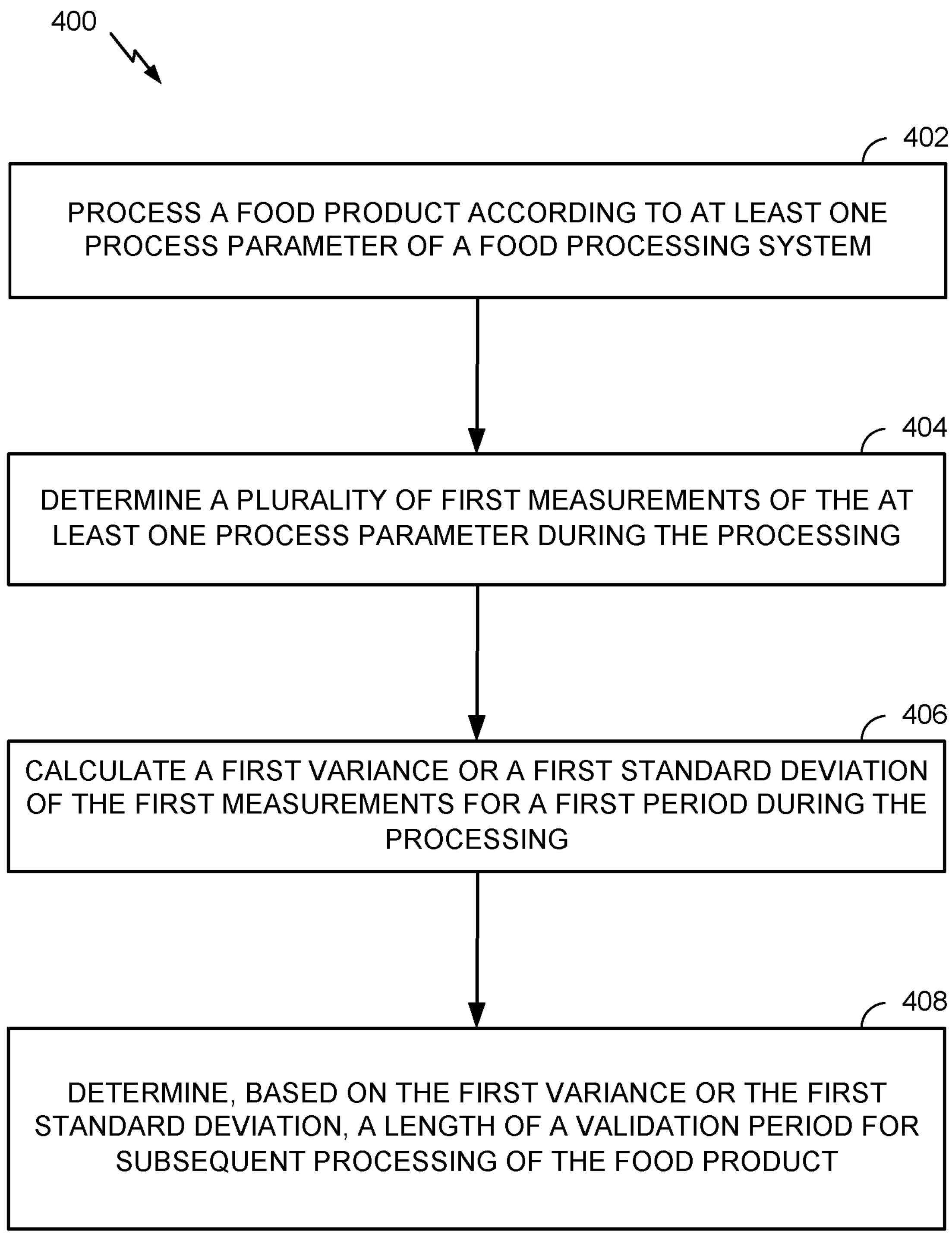
FIG. 4 is a flow diagram of example operations for validating a process for a food processing system, in accordance with certain aspects of the present disclosure.

FIG. 4 is a flow diagram of example operations 400 for validating a food processing system through use of a test window. The operations 400 may be performed by a system for validating and/or verifying operation of a food processing system (e.g., the system 200 shown in FIG. 2).

The operations 400 may begin at block 402 with the system processing a food product according to at least one process parameter of the food processing system. At block 404, the system may determine a plurality of first measurements of the at least one process parameter during the processing. At block 406, the system may calculate a first variance or a first standard deviation (or other statistically significant parameter) of the first measurements for a first period during the processing. At block 408, the system may determine, based on the first variance or the first standard deviation, a length of a validation period for subsequent processing of the food product.

In aspects of the present disclosure, determining the length of the validation period as in block 408 may include: comparing the first variance or the first standard deviation of the first measurements during the first period to a second variance or a second standard deviation of second measurements of the at least one process parameter calculated for a second period, longer than the first period; considering the length of the validation period as equal to the length of the second period if the second variance is greater than the first variance or the second standard deviation is greater than the first standard deviation; and considering the length of the validation period as equal to the length of the first period if the second variance is not greater than the first variance or the second standard deviation is not greater than the first standard deviation.

According to aspects of the present disclosure, the process parameter of block 402 may include at least one of: a temperature of process water, a pH of the process water, or a free active chlorine concentration in the process water.

In aspects of the present disclosure, calculating the first variance or the first standard deviation of the first measurements for the first period at block 406 may include considering historical data of the first measurements of the at least one process parameter from previous processing of the food.

Example Validation Processes

According to aspects of the present disclosure, analysis to determine the boundaries of uncertainty or conversely the accuracy of results with regard to operating parameters of a food processing system is described. Ultimately, one deals with both precision and accuracy. To this point, all the numbers and ranges in this disclosure have been reported without any indication of precision or accuracy of the numbers and ranges. It is desirable for the analysis to include many subcomponents and some covariance that may be considered to achieve the best results. In an analysis of a validation, it is desirable to include the precision and accuracy of the reference, the precision and accuracy of the calibration of the controller, the process capabilities of the processing system, and the inhomogeneity of the process environment that contributes to different portions of the process stream receiving differing processes. These four areas represent sources of error or variance in a typical produce wash operation. Other particular systems including specific wash lines may have additional sources of error that may be addressed in a similar manner. Again, obtaining perfect information is not practical and is often impossible.

In aspects of the present disclosure, the goal is to ensure that all product receives at least a sufficient process. A sufficient process is by definition a process that is always within the boundaries of the critical levels discussed previously. Over-processing is generally not a problem from a validation or food safety perspective. However, over-processing may impact quality and shelf-life, so over-processing is generally avoided to the extent possible while still ensuring that all product receives a valid (i.e., sufficient) process.

One knowledgeable in this art may recognize that the above goal allows for some simplifying assumptions where perfect data is either unattainable or too costly to attain. The above goal also means that simplifying approximations may be made in the rigor of the mathematics used in the analysis, as long as these simplifications err in the conservative direction of more processing.

This discussion of analysis will revolve around three terms including: 1) accuracy, which is measured as the proximity to the true value; 2) precision, which is measured as the dispersion of results; and 3) variance, which is the square of the dispersion or standard deviation. These are functional definitions. Standard references may be consulted if more rigor is desired with regards to these definitions. The following discussion illustrates how analyses of these quantities may be used to validate a process.

According to aspect of the present disclosure, validation of a process may be treated as an error propagation analysis. For example, consider measurements of two quantities, a and b. As with all measurements, there is some uncertainty associated with these measurements, $\sigma_a$ and $\sigma_b$. Properly derived, this uncertainty should reflect the error in both precision and accuracy in these two quantities. Often in practice, it is assumed that error in accuracy is small relative to the error in precision. As a general rule this is true, but it is desirable to evaluate this assumption carefully in the analysis for validation presented herein. The calculation of the error associated with the quantity a±b is not complex if one remembers that variance is additive, as shown below:

$$\sigma_{a\pm b}=(\sigma_a^2+\sigma_b^2\pm\sigma_{ab}^2)^{0.5}$$

Additionally, it is often assumed that the covariance $\sigma_{ab}^2$ is also negligible. This assumption is also generally true, but it may be desirable to also consider this assumption as part of the analysis for validation.

Turning attention back to the critical values in light of the above discussion, it is clear that these numbers are inherently uncertain. As an example, it is unclear what it means to be ≥2 ppm free chlorine. Given that the critical values are experimentally derived, there is error associated with these numbers. However, this error is handled by the simple expediency of adjusting the range of a measured value to reach the desired level of confidence that the performance metric has been met. This confidence is achieved by replicating the determination of the critical value(s) multiple times and then conservatively setting a value that yields the desired level of confidence. Typical choices are 90%, 95%, and 99%. The choice ultimately relates to how much likelihood one can tolerate in the validation. Given that additional errors will be considered and add margins of safety, a 90% confidence will be sufficient in most cases. A multi-dimensional response surface model will yield the confidence interval for the various parameters. Thus, the values used should be at the appropriate confidence interval to ensure that the performance parameter is met. In this multi-dimensional space there are many solutions. It is desirable to identify the weakest process that meets the performance criteria so that all allowed conditions are acceptable. This explains why there is an acceptable pH range, as there are low and high boundaries. Other parameters are just directional.

Many will erroneously believe that the validation process simply involves the use of a surrogate microorganism. However, taking any externally sourced live microorganism into a food processing plant is probably not going to be acceptable, due to the potential for the organism to colonize the plant and possibly interfere with the plant sanitation validation efforts. Even if it were acceptable to potentially contaminate a line (e.g., a food processing system), there is no standard method for using this metric for determining that cross-contamination is prevented. Additionally, the problem of verification is ignored.

A second approach for validation seems more practical, but also lacks foundation. The concept is to demonstrate that control parameters are maintained above some critical level or within certain boundaries during the worst-case conditions. This concept assumes that the critical levels are known and that the worst-case conditions are known. Additionally, one may have to deal with the inhomogeneity of the wash system, which implies that the worst-case conditions might be location-specific within the wash system. Given that there is no established metric for cross-contamination, one may doubt the accuracy of any critical level. Again, the problem of verification is ignored.

A third approach for validation is described herein. Critical level information is difficult to obtain; however, this weakness may be overcome as the body of information grows regarding valid processes and by better measures of the critical values for process parameters, as the metrics become more clearly defined. The described approach relies on demonstrating that the performance objectives are met under conditions that occur during a testing window selected to statistically include all relevant operating conditions that were selected to ensure that the best known critical levels are maintained at all locations at all times. Coupling this validation with the verification tools may be a critical step for dynamic systems.

According to aspects of the present disclosure, to validate a wash process for produce, meat, or other food items, it is desirable to assemble several aspects as discussed above. It is reasonable to consider the elements of a workable metric of performance, a critical level, and a proof that all locations and all allowed operating conditions meet or exceed this critical condition as the elements to validate a process. One skilled in the art will recognize that these elements are intrinsically tied together and may not be practiced independently, given that all will be present in any wash system.

In aspects of the present disclosure, a well-developed process for validating a thermal process may include the following basic steps:

1) Identify the target organism (typically a pathogen) considered reasonably likely to be in the raw material and with the greatest level of resistance to the proposed treatment;
2) Define the process to be validated, including identification of all critical factors affecting the efficacy of the process and all "worst-case" conditions (i.e., operational extremes within which the process is still acceptable) and limits for each of the critical factors within which the facility intends to operate the process;
3) Identify the performance standards that the process should achieve; and
4) Demonstrate through the results of microbial inoculation studies that the process, when operated at the worst-case conditions or limits, will meet the performance standards.

In aspects of the present disclosure, the above approach for thermal process validation may be generalized such that the approach applies to the non-traditional processes under consideration here. As an example, the present disclosure focuses primarily on wash processes for produce. However, the present disclosure is not so limited and is also applicable to wash processes for meat products and other protein foods. Aspects of the present disclosure also apply to some kindred processes, such as chilling meat and other protein foods. The present disclosure is also applicable to other water-based treatments, such as browning control and brining, where solution chemistry may be controlled to assure an appropriate process is completed.

According to aspects of the present disclosure, a four-step implementation plan may be desirable, as outlined below:

1) Prequalification—It is pointless to attempt to validate a process that is not in control. Thus, this step may imply automatic control of the process and available historic data. The process objectives and the associated metrics may be significant.
2) Preparation—At this step, a review of the historic data shows that control has occurred, and the testing window is determined. Also, a schematic of the process line may be used to identify those locations where key parameters should be monitored during the testing window. Plans and procedures to log all control parameters during the testing window and record all other parameters that set the boundaries of the valid process may be put in place.
3) Actual in-plant test execution—This step may involve setting up and calibrating process mapping equipment. The system may be set up to execute process metric procedures for the appropriate number of tests during the testing window. At the end of a regular shift, the system may start the testing window collecting all process parameter data contiguously with the performance data.

4) Analyze and report—Here, process performance metrics may be compared to goal(s) to establish that the process was valid. The process parameters may be utilized to define the process that was used and establish the verification criteria for continuing operations. One may then confirm whether the appropriate controls are set in place to avoid out-of-spec processes.

As mentioned above, changes to a first operating parameter (e.g., pH) of a food processing system may affect whether a second operating parameter (e.g., free active chlorine concentration) is within appropriate boundaries for operation of the food processing system. A margin of error for an operating parameter may be dynamically determined during operation of a food processing system, based on measurements and/or estimated errors in the measurements of other operating parameters.

According to aspects of the present disclosure, an exemplary validation study may be performed on a food wash system. In this example, the output of the validation study is the location where free active chlorine concentrations are consistently at a lowest level in the recirculating water system under all expected conditions, including during the foreseeable worst-case conditions. That location is where it is desirable for a processor to place a sensor that measures free active chlorine during production or to use a validated offset for this position relative to the location of the operating sensor.

In aspects of the present disclosure, the exemplary validation trial may be done as follows:

- A preventive controls qualified individual (PCQI) uses historic process data for multiple shifts of operation to determine a duration of the validation study by determining the window entailed for constant variance in an X-bar chart of the free active chlorine. In the absence of data for a new line, data from similar lines can be used to establish this window. This time window may be expected to be about 4 hours, for example.
- The PCQI selects a metric for measuring cross-contamination control that is compatible with the operating plan. In this example, the PCQI elects to use an artificial capture system and the naturally occurring bacteria as measured by aerobic plate count (APC). This approach adds nothing to the product and will not interrupt production. During the course of the 4-hour validation test, a number (e.g., 12) of individual measurements of cross-contamination control will be made to confirm that the process goal is being met under the actual processing conditions, thus reducing the reliance on the literature.
- In order to understand the actual process, the process parameters should be monitored during the validation trial. The active chlorine level as measured by pH and free chlorine may be monitored by the control system and other sensors placed around the process line to measure the offset to ensure that operating level is sufficient to ensure a proper process at all times and in all locations under all foreseeable conditions.

Assuming that the process metric meets expectations, the process is deemed valid across the tested operating conditions, which include all the expected operating conditions.

Figure 5:
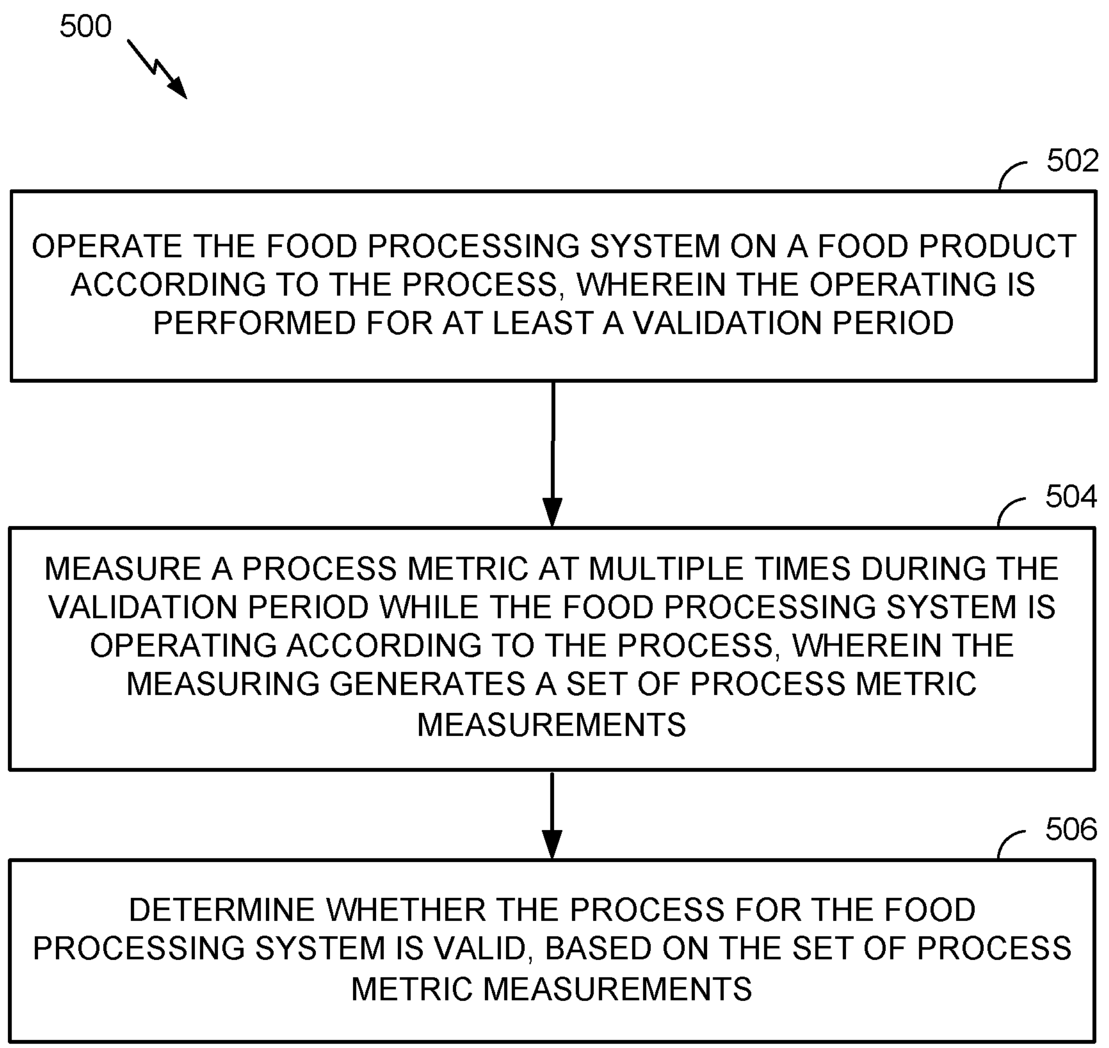
FIG. 5 is a flow diagram of example operations for validating a process for a food processing system, in accordance with certain aspects of the present disclosure.

FIG. 5 is a flow diagram of example operations 500 for validating a process for a food processing system, such as the food processing system 100 illustrated in FIG. 1. At least some of the operations 500 may be performed, for example, by a controller or other processor in or for the food processing system.

The operations 500 may begin at block 502 by operating the food processing system on a food product according to the process, wherein the operating is performed for at least a validation period (i.e., a time window, as described herein). For example, the food processing system 100 (illustrated in FIG. 1) may be washing cut romaine lettuce using wash water incorporating a particular wash solution under test with a first pH range and a first free active chlorine concentration range for the validation period (e.g., four hours).

At block 504, the operations 500 continue with measuring a process metric at multiple times during the validation period while the food processing system is operating according to the process. The measuring at block 504 generates a set of process metric measurements. Continuing the example from above, a process metric (e.g., a lethality metric) is measured at multiple (e.g., twelve to sixteen) times to generate a set of process metric measurements while the food processing system is washing the cut romaine lettuce according to the process during the validation period.

The operations 500 continue at block 506 with determining whether the process for the food processing system is valid, based on the set of process metric measurements. Continuing the example from above, it is determined whether the washing of the cut romaine lettuce using wash water incorporating the particular wash solution under test with the first pH range and the first free active chlorine concentration range is valid, based on the set of process metric measurements (e.g., measurements of the lethality metric) from block 504.

According to aspects of the present disclosure, performing operations 500 may further include selecting the process metric, which may be selected based on the process to be validated.

In aspects of the present disclosure, performing operations 500 may further include confirming the process was actually performed by monitoring one or more process control parameters during the validation period.

According to aspects of the present disclosure, the process metric of block 504 may include a lethality metric or a cross-contamination metric for the food product.

In aspects of the present disclosure, performing operations 500 may further include determining the validation period. In some such aspects of the present disclosure, determining the validation period may be based on historical data for the food processing system based on previous processing of the food product. For certain aspects, determining the validation period entails selecting a time window long enough to have a constant variance of a parameter for the process. In some cases, determining the validation period is based on historical data for another food processing system having previously processed the food product, wherein the other food processing system is similar to the food processing system (e.g., same type of system). A combination of these methods may be used to determine the validation period.

According to aspects of the present disclosure, the food product of block 502 may include leafy greens or fresh-cut produce.

In aspects of the present disclosure, determining whether the process is valid as in block 506 may include determining that each value in the set of process metric measurements meets a criterion.

According to aspects of the present disclosure, the operating of block 502 may include repeatedly assessing at least one parameter for the process, repeatedly comparing the at least one parameter to at least one condition, and repeatedly controlling at least one input variable for the food processing system based on the comparison. In some such aspects, the at least one parameter may include at least one of a temperature of process water in the food processing system, a pH of the process water, or a free active chlorine concentration in the process water. In some such aspects of the present disclosure, at least one of the assessing, the comparing, or the controlling may be performed by a process water monitor and control processor. In some such aspects, the at least one input variable may include an amount of concentrated wash solution, and the controlling may include controlling the amount of concentrated wash solution to add to process water of the food processing system with the process water monitor and control processor.

In aspects of the present disclosure, the operating of block 502 may include repeatedly measuring a parameter for the process at each of a plurality of different locations in the food processing system to generate a plurality of measurements, repeatedly comparing each of the plurality of measurements to a condition, and repeatedly controlling at least one input variable for the food processing system based on the comparisons. In some such aspects, operations 500 may further include assessing an inhomogeneity of the process based on the plurality of measurements of the parameter at the plurality of different locations in the food processing system.

According to aspects of the present disclosure, the operating of block 502 may include: sensing, using a first sensor disposed at a first location in the food processing system, a first measurement of a parameter for the process, wherein the first sensor is calibrated; sensing, using a second sensor disposed at the first location in the food processing system, a second measurement of the parameter; sensing, using a third sensor disposed at a second location different from the first location, a third measurement of the parameter, wherein the second sensor and the third sensor are a same type of sensor; determining a relationship between the first sensor and the second sensor based on the first measurement and the second measurement; and adjusting a value of the third measurement based on the relationship between the first sensor and the second sensor.

Figure 6:
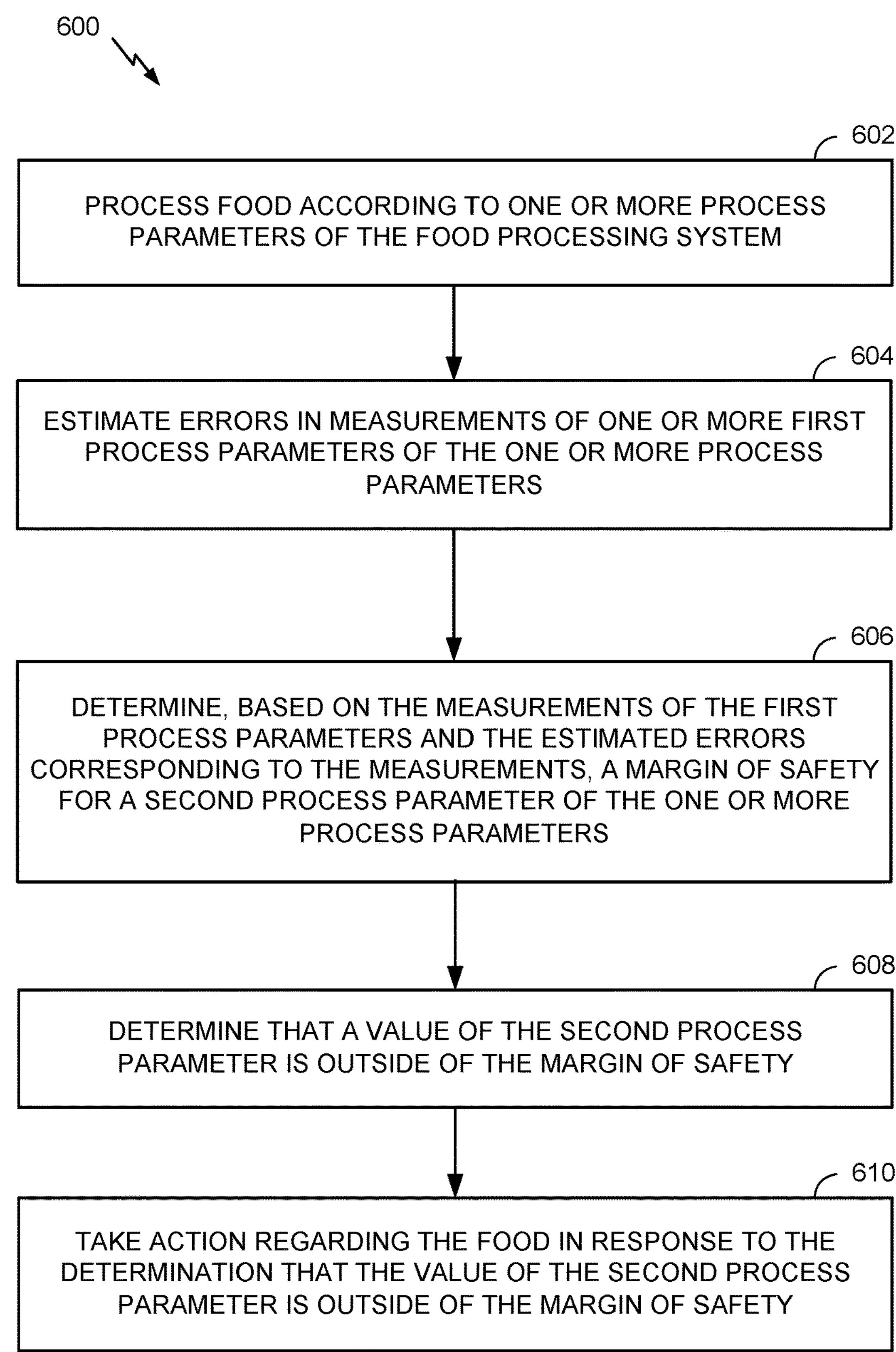
FIG. 6 is a flow diagram of example operations for operating a food processing system, in accordance with certain aspects of the present disclosure.

FIG. 6 is a flow diagram of example operations 600 for operating a food processing system. The operations 600 may be performed by a food processing system, such as food processing system 100 illustrated in FIG. 1.

The operations 600 may begin at block 602 with processing food according to one or more process parameters of the food processing system. For example, the food processing system 100 (illustrated in FIG. 1) may wash cut romaine lettuce using wash water with a first pH and a first free active chlorine concentration.

At block 604, the operations 600 continue with the food processing system estimating errors in measurements of one or more first process parameters of the one or more process parameters. Continuing the example from above, the controller 150 (illustrated in FIG. 1) of the food processing system estimates errors in measurements, of the pH in the turbulence zone 116A, received from the sensor 160A.

The operations 600 continue at block 606 with the food processing system determining, based on the measurements of the first process parameters and the estimated errors corresponding to the measurements, a margin of safety for a second process parameter of the one or more process parameters. Continuing the example from above, the controller 150 (illustrated in FIG. 1) of the food processing system determines, based on the measurement of the pH and the estimated error in the measurement of the pH, a margin of safety for the free active chlorine concentration in the turbulence zone 116A.

At block 608, the operations 600 continue with the food processing system determining that a value of the second process parameter is outside of the margin of safety. Continuing the example from above, the controller 150 (illustrated in FIG. 1) of the food processing system determines that a value of the free active chlorine concentration in the turbulence zone 116A is outside of the margin of safety (e.g., the free active chlorine concentration is low enough that some product may not undergo a valid process) determined in block 606.

The operations 600 continue at block 610 with the food processing system taking action regarding the food in response to the determination that the value of the second process parameter is outside of the margin of safety. Continuing the example from above, the controller 150 (illustrated in FIG. 1) of the food processing system takes action regarding the food (e.g., halts processing of the food and diverts it to container 144 for disposal) in response to the determination that the value of the active free chlorine in the turbulence zone 116A is outside of the margin of safety.

Example Process Preventive Control

An example of establishing and implementing process preventive control and associated preventive control (PC) management components (i.e., monitoring, corrective actions and corrections, and verification activities (and their associated records)) to control biological hazards in wash water used during the production of fresh-cut produce is described as follows. In this example, a fresh-cut processor that washes fresh-cut romaine lettuce in a recirculating water flume system with sodium hypochlorite and an acidulant added to wash water is described. The sodium hypochlorite may act as a source of the antimicrobial substance, hypochlorous acid, when pH of the wash water is controlled. The hypochlorous acid functions as a process preventive control to significantly minimize or prevent the cross-contamination of fresh-cut leafy vegetables with biological hazards (e.g., *E. coli*) during washing of the leafy vegetables.

In this example, the processor washes fresh-cut romaine lettuce of various cut sizes (0.5 inches-1.5 inches) in a single-stage chilled water flume using water from a municipal source. The processor adds liquid sodium hypochlorite and citric acid, a common if not preferred acidulant, using an automated supervisory control and data acquisition (SCADA) system in a recirculation tank. The SCADA system is configured (e.g., by the processor) to maintain a minimum free active chlorine concentration in the wash water sufficient to significantly minimize or prevent cross-contamination at all points in the wash tank. The SCADA system is also configured to maintain a pH near 6.0, such that hypochlorous acid is the predominant chlorine species in the wash water. An operating limit for a minimum level of free active chlorine is determined by a validation process, according to aspects of the present disclosure. Water automatically replenishes in the recirculation tank, where particulates may be removed by a separating screen. In the example system, the conveyor feeding the product into the flume system is controlled by a controller of the food processing system to stop automatically if the free active chlorine concentration drops below the operating limit. The processor continuously monitors the free chlorine concentration and pH using the controller, whose precision and accuracy are validated. This validation entails periodic calibration and calibration checks. Manual checks of chlorine and pH are unnecessary with a controller of known reliability, although process checks by Quality Assurance can be logged to ensure that the system is performing appropriately. The processor begins processing with new flume water as necessary to conform with the parameters of the validated process as indicated by the verification system to minimize the environmental impact of the water use and chemical discharges.

While the present disclosure has included detail in connection with only a limited number of embodiments, it should be readily understood that the present disclosure is not limited to such described embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" may include a range of ±8% or 5%, or 2% of a given value.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment described as the best mode contemplated for carrying out this present disclosure, but that the present disclosure will include all embodiments falling within the scope of the claims.

The invention claimed is:

1. A method for validating a process for a food processing system, comprising:

causing the food processing system to process a first quantity of a food product according to at least one process parameter of the food processing system;

determining a plurality of measurements of the at least one process parameter from processing the first quantity of the food product;

calculating a first variance or a first standard deviation of the plurality of measurements for a first period during the processing;

determining, based on the first variance or the first standard deviation of the plurality of measurements, a length of a validation period for subsequent processing, with the food processing system, of a second quantity of the food product; and causing the food processing system to process the second quantity of the food product based, at least in part, on the at least one process parameter of the food processing system and on the determined length of the validation period.

2. The method of claim 1, wherein determining the length of the validation period comprises:

calculating a second variance of the plurality of measurements for a second period during the processing, the second period being longer than the first period;

comparing the first variance of the plurality of measurements for the first period to the second variance of the plurality of measurements of the at least one process parameter;

determining the length of the validation period to be equal to the length of the second period when the second variance is greater than the first variance; and determining the length of the validation period to be equal to the length of the first period when the second variance is not greater than the first variance.

3. The method of claim 1, wherein determining the length of the validation period comprises:

calculating a second standard deviation of the plurality of measurements for a second period during the processing, the second period being longer than the first period;

comparing the first standard deviation of the plurality of measurements for the first period to the second standard deviation of the plurality of measurements of the at least one process parameter;

determining the length of the validation period to be equal to the length of the second period when an absolute value of the second standard deviation is greater than an absolute value of the first standard deviation; and determining the length of the validation period to be equal to the length of the first period when the absolute value of the second standard deviation is not greater than the absolute value of the first standard deviation.

4. The method of claim 1, wherein calculating the first variance or the first standard deviation of the plurality of measurements for the first period is based on historical data of the plurality of measurements of the at least one process parameter from previous processing of a third quantity of the food product.

5. The method of claim 1, wherein the at least one process parameter comprises at least one of:

a temperature of process water of the food processing system;

a pH of the process water of the food processing system; or a free active chlorine concentration in the process water of the food processing system.

6. An apparatus for validating a process for a food processing system, the apparatus comprising:

memory configured to store instructions; and one or more processors coupled to the memory and configured to execute the instructions to:

cause the food processing system to process a first quantity of a food product according to at least one process parameter of the food processing system;

determine a plurality of measurements of the at least one process parameter from processing the first quantity of the food product;

calculate a first variance or a first standard deviation of the plurality of measurements for a first period during the processing;

determine, based on the first variance or the first standard deviation of the plurality of measurements, a length of a validation period for subsequent processing, with the food processing system, of a second quantity of the food product; and cause the food processing system to process the second quantity of the food product based, at least in part, on the at least one process parameter of the food processing system and on the determined length of the validation period.

7. The apparatus of claim 6, wherein to determine the length of the validation period, the one or more processors are configured to:

calculate a second variance of the plurality of measurements for a second period during the processing, the second period being longer than the first period;

compare the first variance of the plurality of measurements for the first period to the second variance of the plurality of measurements of the at least one process parameter;

determine the length of the validation period to be equal to the length of the second period when the second variance is greater than the first variance; and determine the length of the validation period to be equal to the length of the first period when the second variance is not greater than the first variance.

8. The apparatus of claim 6, wherein to determine the length of the validation period, the one or more processors are configured to:

calculate a second standard deviation of the plurality of measurements for a second period during the processing, the second period being longer than the first period;

compare the first standard deviation of the plurality of measurements for the first period to the second standard deviation of the plurality of measurements of the at least one process parameter;

determine the length of the validation period to be equal to the length of the second period when an absolute value of the second standard deviation is greater than an absolute value of the first standard deviation; and determine the length of the validation period to be equal to the length of the first period when the absolute value of the second standard deviation is not greater than the absolute value of the first standard deviation.

9. The apparatus of claim 6, wherein to calculate the first variance or the first standard deviation, the one or more processors are configured to calculate the first variance or the first standard deviation of the plurality of measurements for the first period based on historical data of the plurality of measurements of the at least one process parameter from previous processing of a third quantity of the food product.

10. The apparatus of claim 6, wherein the at least one process parameter comprises at least one of:

a temperature of process water of the food processing system;

a pH of the process water of the food processing system; or a free active chlorine concentration in the process water of the food processing system.

11. A non-transitory computer-readable medium comprising instructions, executable by one or more processors, for performing operations for validating a process for a food processing system, the operations comprising:

causing the food processing system to process a first quantity of a food product according to at least one process parameter of the food processing system;

determining a plurality of measurements of the at least one process parameter from processing the first quantity of the food product;

calculating a first variance or a first standard deviation of the plurality of measurements for a first period during the processing;

determining, based on the first variance or the first standard deviation of the plurality of measurements, a length of a validation period for subsequent processing, with the food processing system, of a second quantity of the food product; and causing the food processing system to process the second quantity of the food product based, at least in part, on the at least one process parameter of the food processing system and on the determined length of the validation period.

12. The non-transitory computer-readable medium of claim 11, wherein determining the length of the validation period comprises:

calculating a second variance of the plurality of measurements for a second period during the processing, the second period being longer than the first period;

comparing the first variance of the plurality of measurements for the first period to the second variance of the plurality of measurements of the at least one process parameter;

determining the length of the validation period to be equal to the length of the second period when the second variance is greater than the first variance; and determining the length of the validation period to be equal to the length of the first period when the second variance is not greater than the first variance.

13. The non-transitory computer-readable medium of claim 11, wherein determining the length of the validation period comprises:

calculating a second standard deviation of the plurality of measurements for a second period during the processing, the second period being longer than the first period;

comparing the first standard deviation of the plurality of measurements for the first period to the second standard deviation of the plurality of measurements of the at least one process parameter;

determining the length of the validation period to be equal to the length of the second period when an absolute value of the second standard deviation is greater than an absolute value of the first standard deviation; and determining the length of the validation period to be equal to the length of the first period when the absolute value of the second standard deviation is not greater than the absolute value of the first standard deviation.

14. The non-transitory computer-readable medium of claim 11, wherein calculating the first variance or the first standard deviation of the plurality of measurements for the first period is based on historical data of the plurality of measurements of the at least one process parameter from previous processing of a third quantity of the food product.

15. The non-transitory computer-readable medium of claim 11, wherein the at least one process parameter comprises at least one of:

a temperature of process water of the food processing system;

a pH of the process water of the food processing system; or free active chlorine concentration in the process water of the food processing system.

* * * * *